(12) United States Patent
Shakouri et al.

(10) Patent No.: US 12,226,754 B2
(45) Date of Patent: Feb. 18, 2025

(54) METHOD TO PRODUCE HIGH DENSITIES OF ISOLATED ATOMS ON SUPPORT SUBSTRATES

(71) Applicant: University of South Carolina, Columbia, SC (US)

(72) Inventors: Abolfazl Shakouri, Columbia, SC (US); Horie Adabi Firouzjaie, Columbia, SC (US); John R. Regalbuto, Columbia, SC (US); Christopher T. Williams, Columbia, SC (US); William E Mustain, Blythewood, SC (US)

(73) Assignee: University of South Carolina, Columbia, SC (US)

( * ) Notice: Subject to any disclaimer, the term of this patent is extended or adjusted under 35 U.S.C. 154(b) by 90 days.

(21) Appl. No.: 17/515,700

(22) Filed: Nov. 1, 2021

(65) Prior Publication Data
US 2022/0203335 A1    Jun. 30, 2022

Related U.S. Application Data

(60) Provisional application No. 63/131,858, filed on Dec. 30, 2020.

(51) Int. Cl.
| | |
|---|---|
| *B01J 23/42* | (2006.01) |
| *B01J 21/18* | (2006.01) |
| *B01J 37/00* | (2006.01) |
| *B01J 37/04* | (2006.01) |
| *B01J 37/08* | (2006.01) |
| *B01J 37/18* | (2006.01) |

(52) U.S. Cl.
CPC ............... *B01J 23/42* (2013.01); *B01J 21/18* (2013.01); *B01J 37/0018* (2013.01); *B01J 37/04* (2013.01); *B01J 37/08* (2013.01); *B01J 37/18* (2013.01)

(58) Field of Classification Search
CPC ........ B01J 23/42; B01J 21/18; B01J 37/0018; B01J 37/04; B01J 37/08; B01J 37/18
USPC ......................................... 502/185, 240, 350
See application file for complete search history.

(56) References Cited

U.S. PATENT DOCUMENTS

| 4,217,249 A * | 8/1980 | McVicker | B01J 23/46 556/14 |
|---|---|---|---|
| 7,312,174 B2 * | 12/2007 | Regalbuto | H01M 4/92 502/181 |
| 10,016,751 B2 * | 7/2018 | Monnier | B01J 23/42 |
| 11,219,892 B2 * | 1/2022 | Gilliland | C07F 7/0801 |
| 2009/0321320 A1 * | 12/2009 | Wu | B01J 31/16 502/220 |
| 2012/0004098 A1 * | 1/2012 | Xiao | B01J 37/0236 502/185 |
| 2013/0302715 A1 * | 11/2013 | Horikita | H01M 8/1011 502/185 |
| 2015/0280247 A1 * | 10/2015 | Garsuch | H01M 4/8615 429/405 |

FOREIGN PATENT DOCUMENTS

| CN | 101370581 A | * | 2/2009 | ............. B01J 21/08 |
|---|---|---|---|---|
| CN | 101374598 A | * | 2/2009 | ............. B01J 21/04 |
| JP | 2004207092 A | * | 7/2004 | ............. H01M 4/88 |

* cited by examiner

*Primary Examiner* — Patricia L. Hailey
(74) *Attorney, Agent, or Firm* — Offit Kurman; Douglas Lineberry

(57) ABSTRACT

Described herein is a general scalable synthesis method for a high density of single metal atoms in a supported catalyst, supported isolated atoms featuring unique reactivity and the support materials determine the stability, electronic properties, and local environment which can be adjusted for targeted heterogeneous catalysis applications.

17 Claims, 24 Drawing Sheets

Uracil

M = Mn, Cu, Ni

Structure of 8-hydroxyquinoline-uracil metal complexes

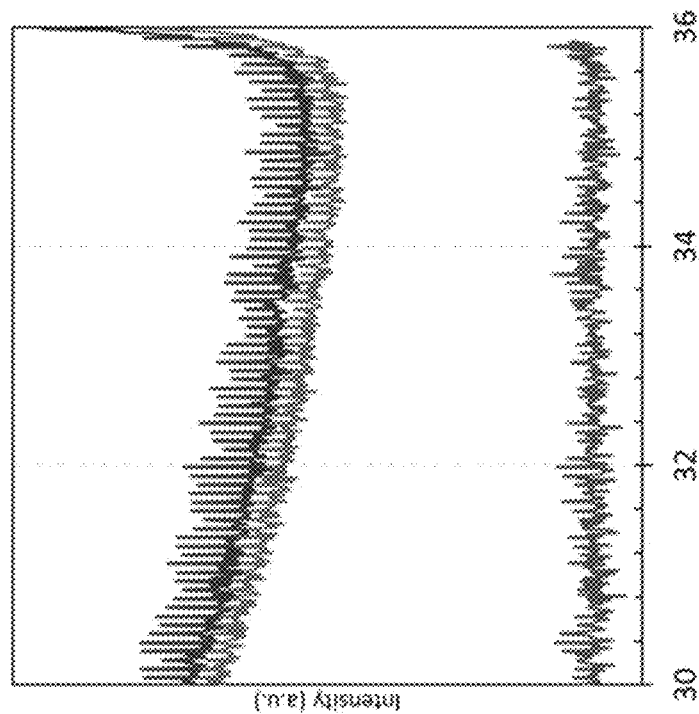
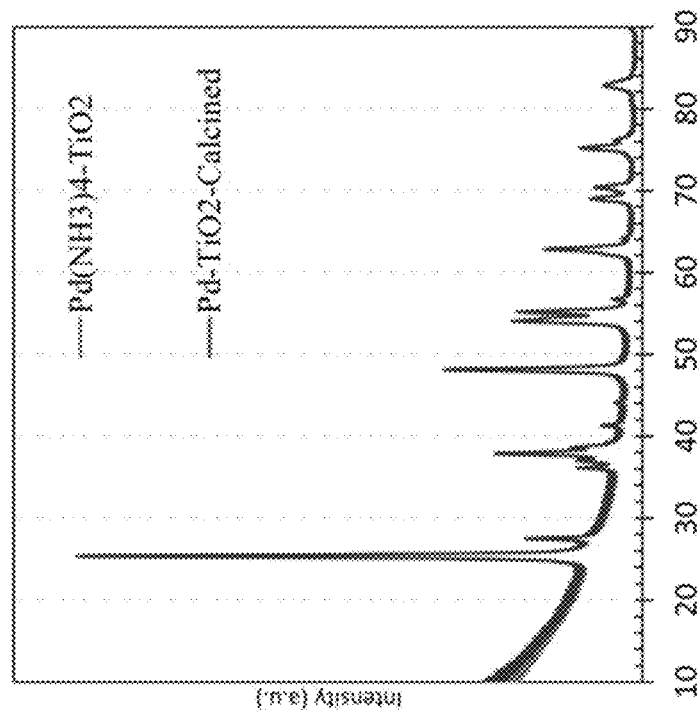
FIGURE 8B
FIGURE 8A

TABLE 1

Compositions and applications of SACs with selected supports.

| Support types | Supports | Single atoms | Applications |
|---|---|---|---|
| Metal | Cu (1 1 1) | Pt | Selective hydrogenation of 1,3-butadiene |
| Metal | Cu | Ag | H₂ formation in methanol reforming |
| Metal | Cu | Pt | Selective hydrogenation of acetylene |
| Metal | Pt nanowire | Ni | Methanol oxidation reaction |
| | | | Ethanol oxidation reaction |
| Carbon material | Graphdiyne | Pt | Hydrogen evolution reaction |
| Carbon material | S-doped carbon | Fe | Oxygen reduction reaction |
| | | | Oxygen evolution reaction |
| | | | Metal-air battery |
| Carbon material | N-doped carbon | Pt, Ru, Fe, Co, Ni, Mo, Mn, Cu | $CO_2$ reduction reaction |
| | | | Oxygen reduction reaction |
| | | | Hydrogen evolution reaction |
| | | | Nitrogen fixation |
| | | | Metal-air battery |
| Carbon material | N-doped carbon | Sn | $CO_2$ reduction reaction |
| Carbon material | Graphene | Co | Hydrogenation of nitroarenes |
| Metal sulfide | MoS₂ | Co, Pt, Ni | Hydrodeoxygenation reaction |
| | | | Hydrogen evolution reaction |
| Metal sulfide | MoS₂ | Co | Peroxidase-like reaction |
| Metal carbide | MoC | Pt | Hydrogenation from water and methanol |
| Metal nitride | TiN | Pt | Oxygen reduction reaction |
| Metal hydroxide | Al₂O₃ | Pt | Hydrogenation reaction |
| Metal hydroxide | FeO_x | Pt, Ir | CO oxidation reaction |
| | | | CO oxidation reaction |
| Metal hydroxide | ZnO | Rh | Hydrogenation of nitroarenes |
| | | | Water-gas shift |
| | | | Hydroformylation of olefins |
| Metal hydroxide | ZrO₂ | Pd | Direct synthesis of indole |
| Metal hydroxide | MgO | Ni | $CO_2$ reduction |

FIGURE 24

METHOD TO PRODUCE HIGH DENSITIES OF ISOLATED ATOMS ON SUPPORT SUBSTRATES

STATEMENT REGARDING FEDERALLY SPONSORED RESEARCH

This disclosure was made with government support under DE-EE0008433 awarded by Department of Energy. The government may have certain rights in the invention.

TECHNICAL FIELD

The subject matter disclosed herein is generally directed to a general scalable synthesis method for a high density of single metal atoms in a supported catalyst, supported isolated atoms featuring unique reactivity and the support materials determine the stability, electronic properties, and local environment which can be adjusted for targeted heterogeneous catalysis applications.

BACKGROUND

Useful chemicals are widely synthesized by homogeneous transition metal-catalyzed reactions. However, the aggregation and precipitation of atomically dispersed catalysts causes considerable loss of activity. This has spurred interest in the heterogenization of atomically dispersed catalysts to impart stability and facilitate recyclability. The current synthesis methods are not scalable and do not yield a high density of single atoms on the support.

Accordingly, it is an object of the present disclosure to provide a synthesis method that is scalable and yields a very high density of stable single atoms on a support.

Citation or identification of any document in this application is not an admission that such a document is available as prior art to the present disclosure.

SUMMARY

The above objectives are accomplished according to the present disclosure by providing a method for producing heterogeneous single atom catalysts. The method may include dissolving at least one catalyst precursor in water to form a solution, mixing at least one support substrate in the solution, providing at least one metal precursor to the solution, preventing precursor agglomeration via dissolving at least one non-water soluble chelating agent in at least one polar solvent and adding this to the solution, providing and fixating precursor ions during catalyst activation, anchoring at least one metal precursor to the at least one support substrate, and reducing the solution. Further, the at least one support substrate may comprise carbon or an oxide. Yet still, the carbon may include carbon black, activated carbon, and/or diamond powder. Further again, the oxide may include $TiO_2$ and/or $SiO_2$. Moreover, the method may include yielding loadings of single atoms up to at least 1 atom per $nm^2$. Still further, the at least one chelating agent may be 8-hydroxyquinoline. Still yet again, the method may not require strong electrostatic adsorption is not required to induce anchoring. Furthermore, either anionic or cationic precursors may be used. Furthermore, reduction may be conducted at approximately 300° C. Still yet further, the at least one support substrate may form a pore framework. Again further, the method may include chelating metal ions or metal ion complexes with at least one ligand. Yet further, the method may include producing at least one single atom on the at least one support substrate without the at least one support substrate having surface functional groups. Again still, the method may remove the at least one chelating agent via high temperature treatment or washing with acetone followed by drying. Still yet again, the method may include adjusting the at least one chelating agent to the at least one metal precursor ratio to 2:1.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIGS. 8A and 8B shows X-ray diffraction analysis of 1.95 wt % $Pd/SiO_2$.

FIG. 24 shows Table 1, Compositions and applications of SACs with selected reports.

Figure 1:
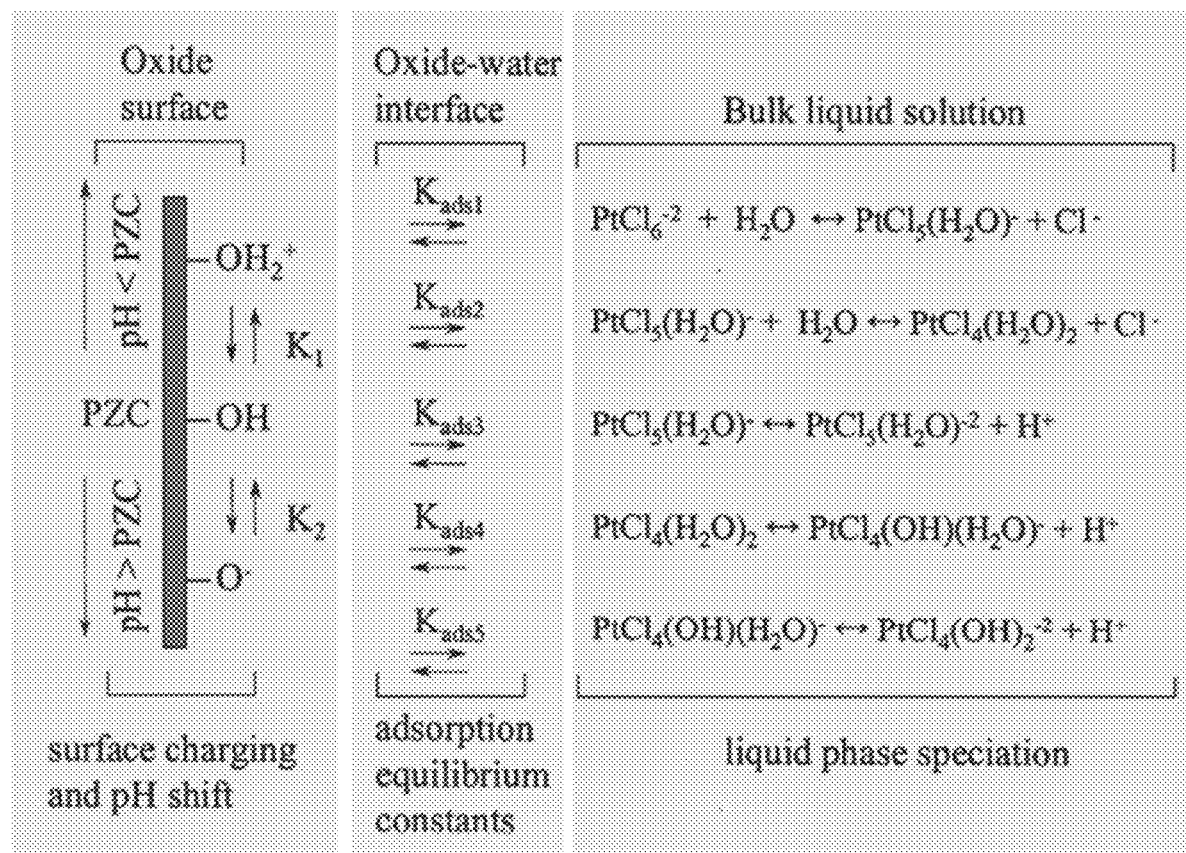
FIG. 1 shows one adsorption synthesis of the current disclosure.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximately," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used interchangeably herein, the terms "sufficient" and "effective," can refer to an amount (e.g. mass, volume, dosage, concentration, and/or time period) needed to achieve one or more desired and/or stated result(s). For example, a therapeutically effective amount refers to an amount needed to achieve one or more therapeutic effects.

As used herein, the terms "weight percent," "wt %," and "wt. %," which can be used interchangeably, indicate the percent by weight of a given component based on the total weight of a composition of which it is a component, unless otherwise specified. That is, unless otherwise specified, all wt % values are based on the total weight of the composition. It should be understood that the sum of wt % values for all components in a disclosed composition or formulation are equal to 100. Alternatively, if the wt % value is based on the total weight of a subset of components in a composition, it should be understood that the sum of wt % values the specified components in the disclosed composition or formulation are equal to 100.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

We developed a generalized synthesis method for producing supported single atom catalyst. It is based on a strong electrostatic adsorption (SEA) synthesis method. In this method, a layer of precursor ion is adsorbed on the surface of the support and then a chelating agent with a boiling point higher than reduction temperature of the metal precursor added to the resulting mixture. The activation of the resulting catalyst is the following step at higher temperature than boiling point of chelating agent. It results in atomically dispersed metal catalyst which is coordinatively unsaturated and consequently highly active. The resulting supported single atom catalyst could be a bridge between homogeneous catalysis and heterogeneous catalysis at the very extreme of the field.

We developed a general scalable synthesis method for a high density of single metal atoms in a supported catalyst. The single atom catalyst has the highest utilization of precious metals in the catalyst. Single atom catalysts are highly active and supported isolated atoms featuring unique reactivity. The support materials determine the stability, electronic properties, and local environment which can be adjusted for targeted heterogeneous catalysis applications.

Our technology is a general, low cost, simple, scalable and highly efficient synthesis method for catalysts with high densities of stable, isolated atoms.

Here, a monolayer of precursor is adsorbed on the surface of the support. This typically results in very small nanoparticles after catalyst activation, uniform distribution of catalyst particles, and well alloyed particles in case of bimetallic catalysts. The current disclosure provides adding a chelating agent with a higher boiling point than the catalyst's activation temperature on the adsorbed metal precursor ion after SEA and before catalyst activation to create high-density single-atom supported catalysts. One suitable chelating agent is 8-Hydroxyquinoline, with a boiling point of 276° C., and similar compounds are suitable chelating agent candidates.

8-Hydroxyquinoline and its derivatives have a wide spectrum of biologically relevant activities, and the 8HQ scaffold is regarded as a privileged structure due to its chemical accessibility and broad scope of potential medicinal applications, which include treating cancer, neurodegenerative diseases, and microbial infections. See, Veda Prachayasittikul, et al, "8-Hydroxyquinolines: A Review Of Their Metal Chelating Properties And Medicinal Applications," *Drug Design, Development and Therapy,* 2013:7 1157-1178.

8-Hydroxyquinoline is one of the oldest antibacterial agents with documented antiseptic uses dating back to 1895 (Albert & Magrath, 1947), and anti-infective uses in humans dating to before the age of modern antibiotics (Mcelroy, 1910). As early as the 1940s, 8HQ's strong affinity for metal ions was recognized to bestow the molecule with potent antimicrobial properties against a variety of bacterial pathogens at micromolar concentrations (Albert, Gibson, & Rubbo, 1953; Albert, Hampton, Selbie, & Simon, 1954; Albert & Rubro, 1947; Rubbo, Albert, & Gibson, 1950; Shah et al., 2016).

Figure 2:
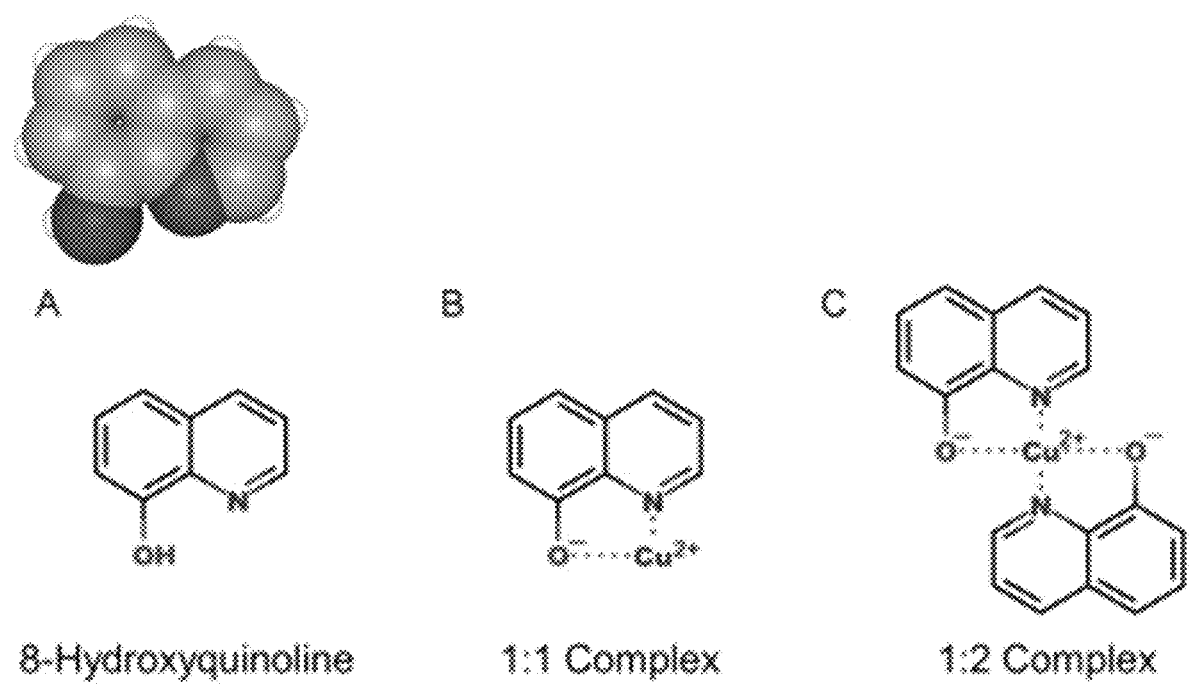
FIG. 2 shows the chemical structures of 8-Hydroxyquinoline as well as complexes of same.
Figure 3:
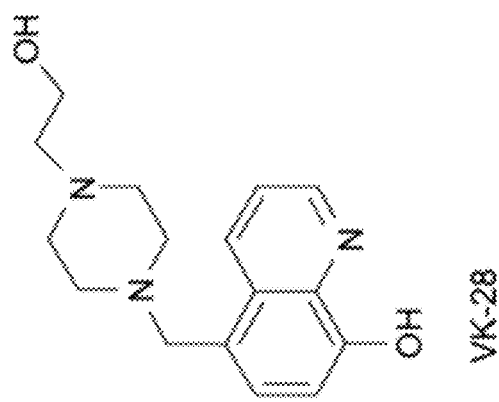
FIG. 3 shows different chelating agents based on 8-Hydroxyquinoline.
Figure 3:
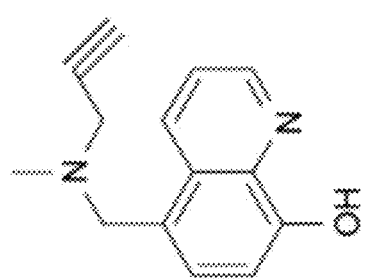
Figure 3:
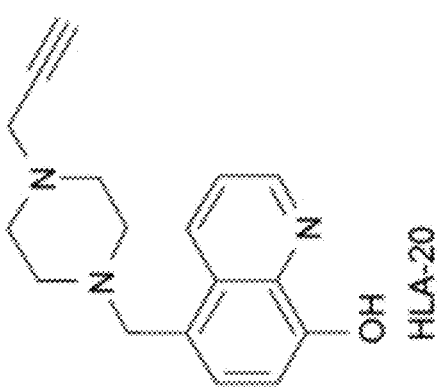
Figure 3:
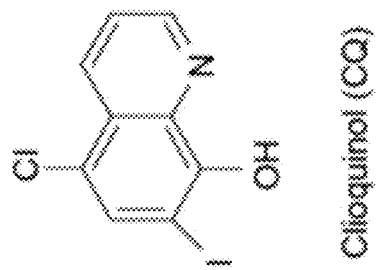
Figure 3:
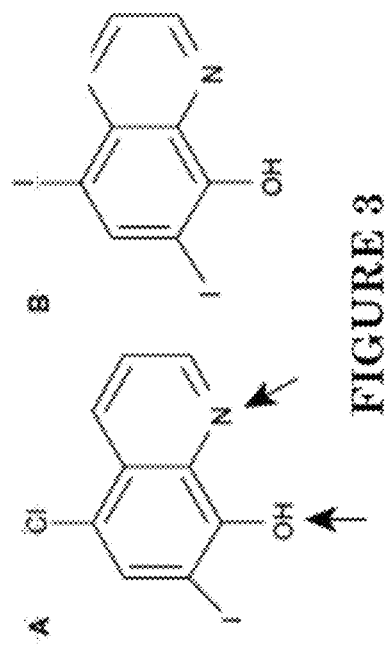
Figure 4A:
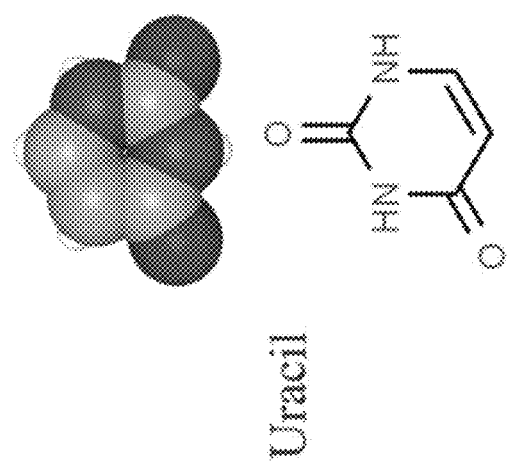
FIGS. 4A and 4B show the chemical structure of Uracil as well as Uracil metal complexes.
Figure 4B:
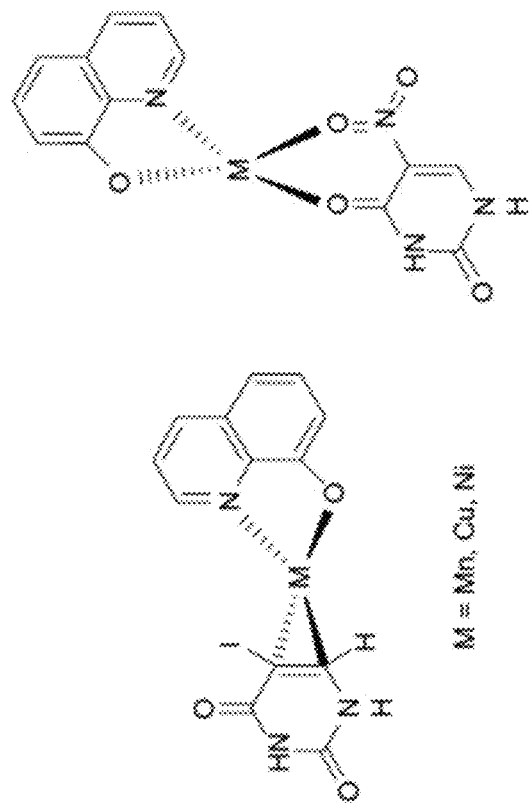

8HQ is a classical ligand that closely follows the Irving-Williams series in terms of affinity for bivalent transition metal ions. When in a ligand/metal complex, two coordination geometries are possible, see FIG. 2. At low ligand concentrations (relative to the metal ion) a 1:1 complex will form. When the ligand is in excess, an additional molecule joins, forming a dihydroxyquinoline metal complex (1:2 complex) with square planar coordination geometry (Albert et al., 1953). It has not yet been established with certainty which of the two complexes is responsible for 8HQ's different bioactivities. FIG. 3 shows chemical structures of various chelating agents that may be based on 8-Hydroxyquinoline. These include: 8-Hydroxyquinoline derivatives with potent anti-neurodegenerative activity such as: HLA-20, 5-((4-(prop-2-ynyl)piperazin-1-yl)methyl) quinolin-8-ol; M30, 5-((methyl(prop-2-ynyl)amino)methyl)quinolin-8-ol; VK-28, 5-((4-(2-hydroxyethyl)piperazin-1-yl)methyl) quinolin-8-ol. One potential chelating agent is Uracil, see FIG. 4A. Uracil is water soluble with a melting point of 335° C. FIG. 4B shows examples of Uracil metal complexes.

Figure 5:
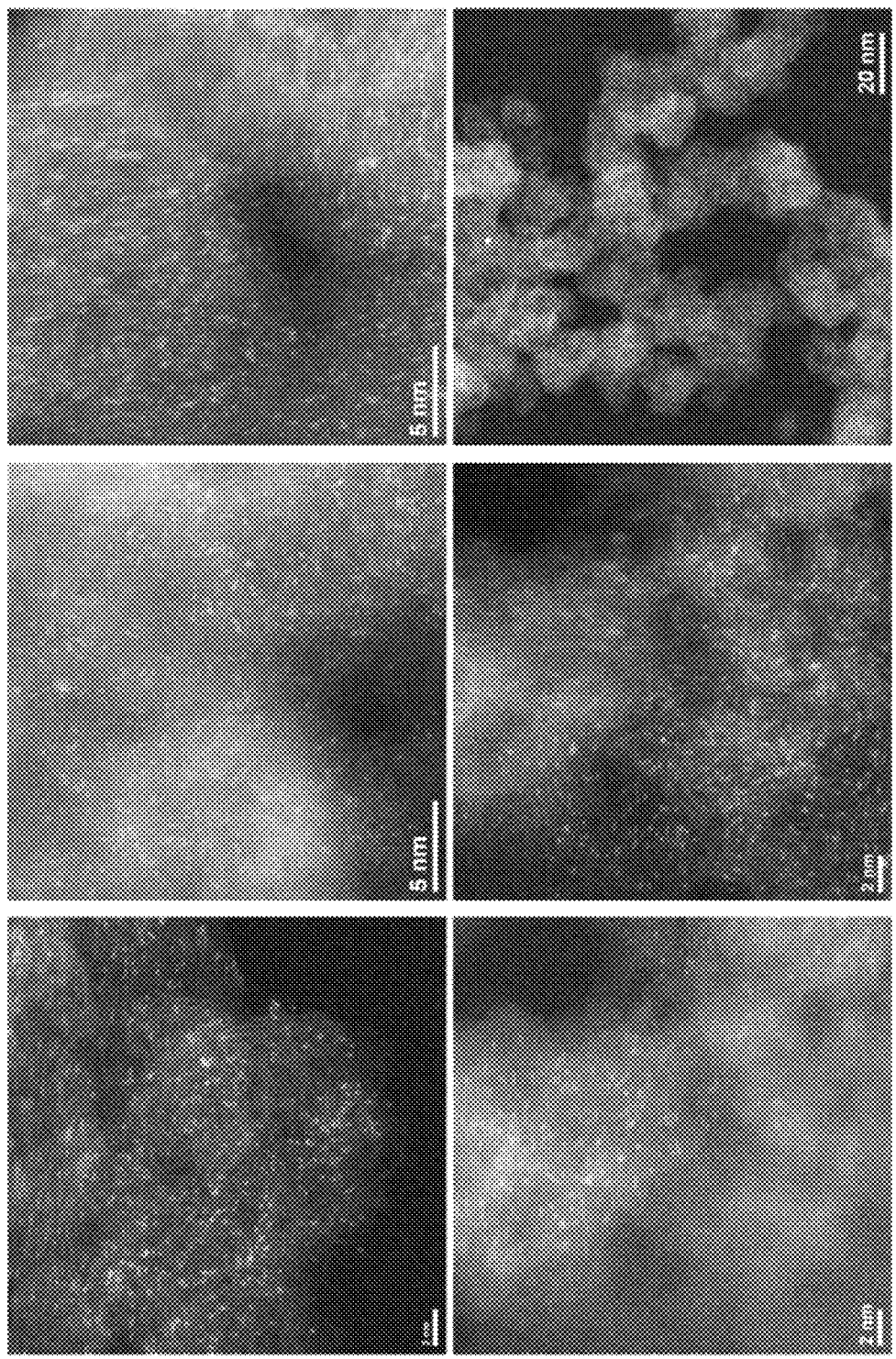
FIG. 5 shows 3.5 wt % Pt/VXC-72 SEA/H&N Modified Method Reduced at 300° C.
Figure 6:
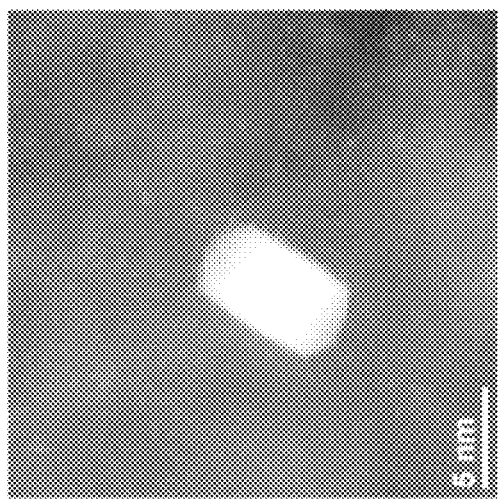
FIG. 6 shows 3.5 wt % Pt/VXC-72 SEA/H&N Modified Method Reduced at 300° C.
Figure 6:
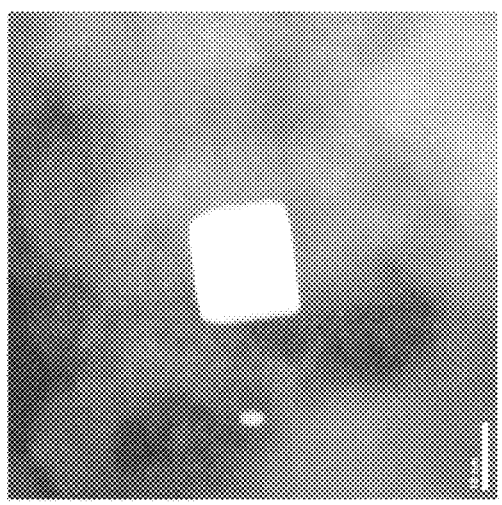
Figure 6:
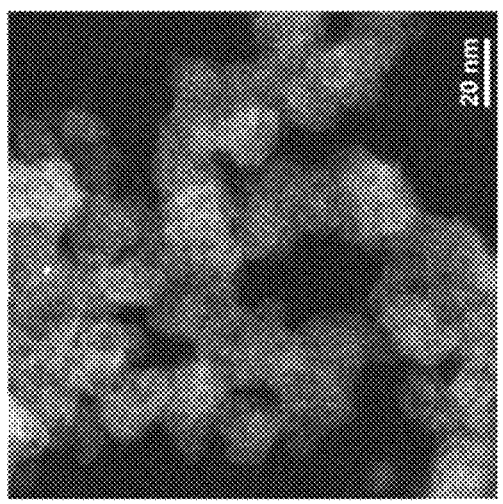
Figure 7:
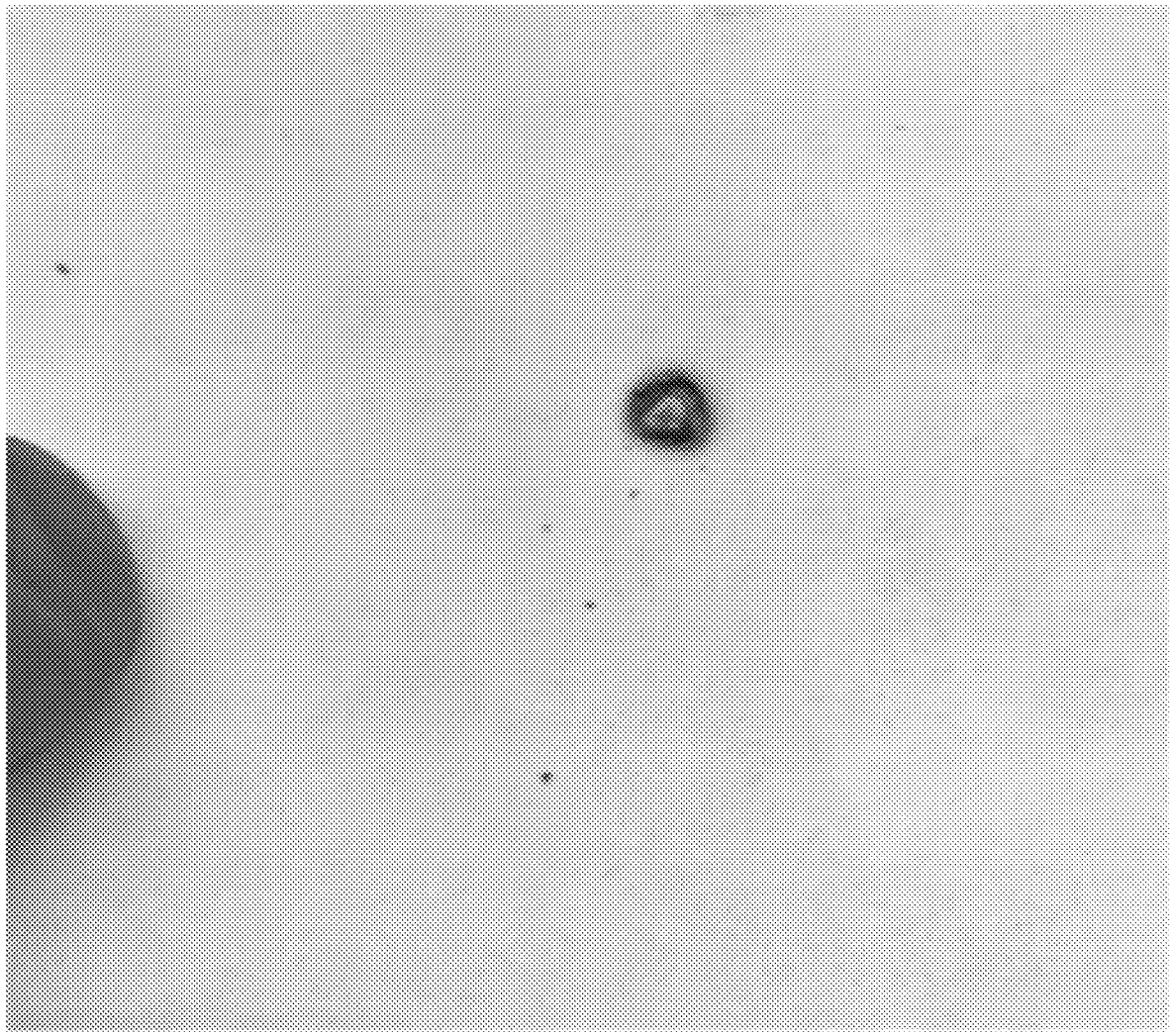
FIG. 7 shows a picture of 3.9 wt % Pt—Ru/VXC-72 2.4 wt % Pt 1.5 wt % Ru 1~1 Pt:Ru.
Figure 9:
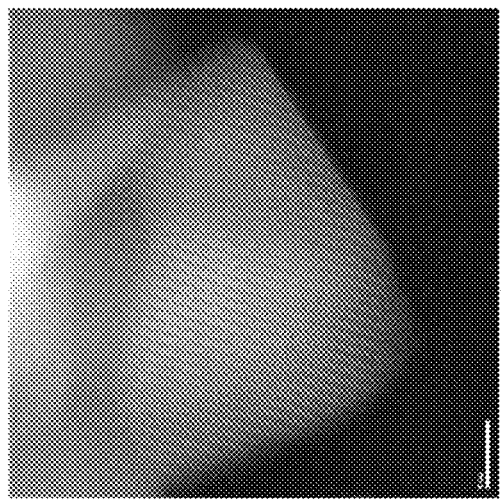
FIG. 9 shows an EM of 1.97% $Pd/TiO_2$.
Figure 9:
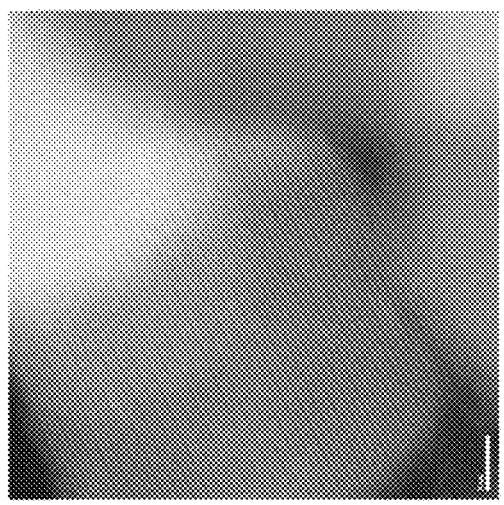
Figure 9:
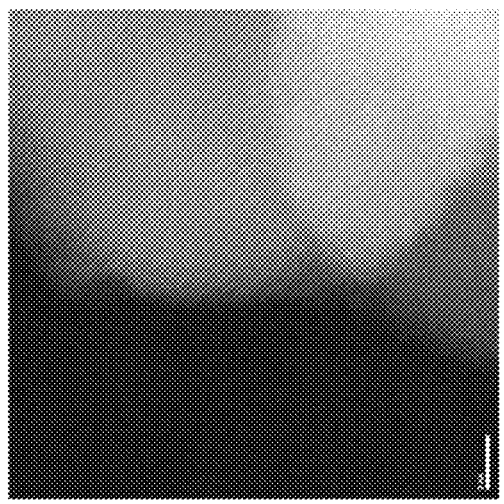

The method of the current disclosure may include filtering, drying, activating the catalyst via reduction/decomposition, FIG. 5 shows 3.5 wt % Pt/VXC-72 SEA/H&N Modified Method Reduced at 300° C. FIG. 6 shows 3.5 wt % Pt/VXC-72 SEA/H&N Modified Method Reduced at 300° C. FIG. 7 shows 3.9 wt % Pt—Ru/VXC-72 2.4 wt % Pt 1.5 wt % Ru 1~1 Pt:Ru. FIG. 8 shows X-ray diffraction analysis of 1.95 wt % Pd/SiO$_2$. FIG. 9 shows an EM of 1.97% Pd/TiO$_2$. FIG. 10 FIG. 11 shows an EM image of 1.5 wt % Pt/TiO$_2$.

Figure 10A:
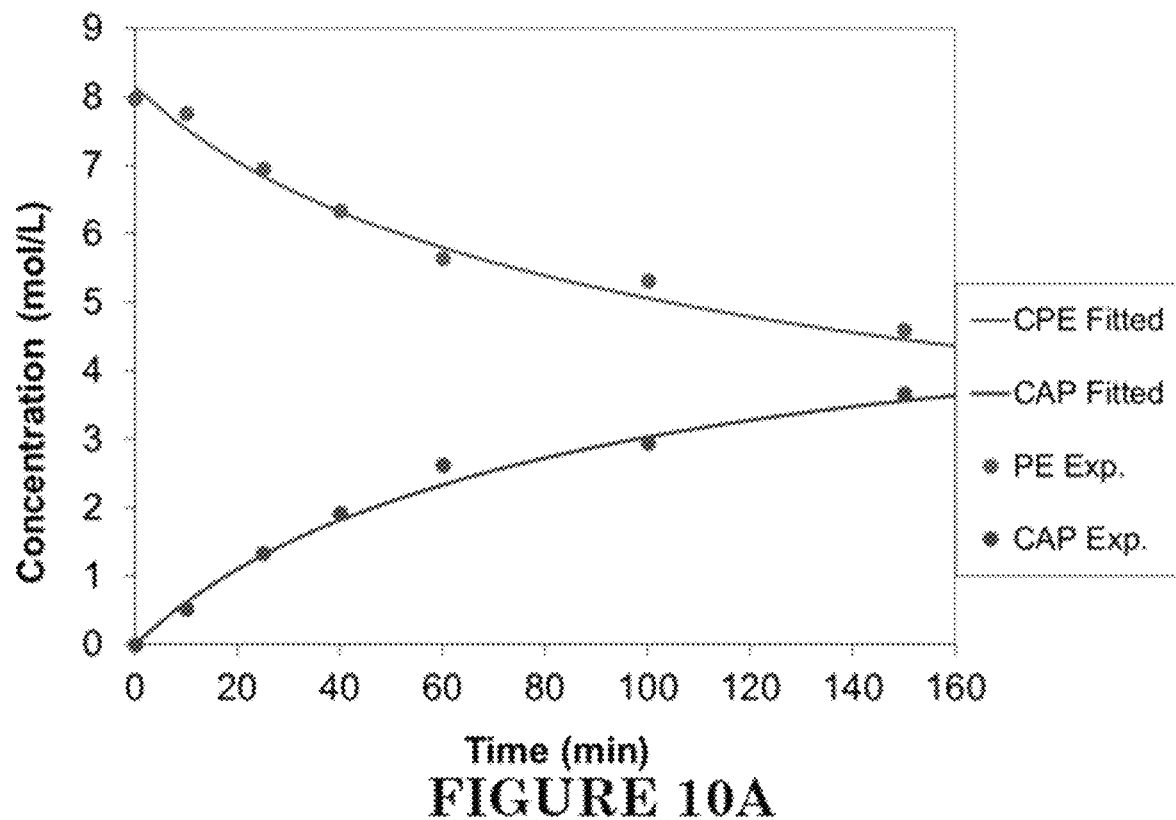
FIGS. 10A and 10B shows potential reaction conditions of the current disclosure.
Figure 10B:
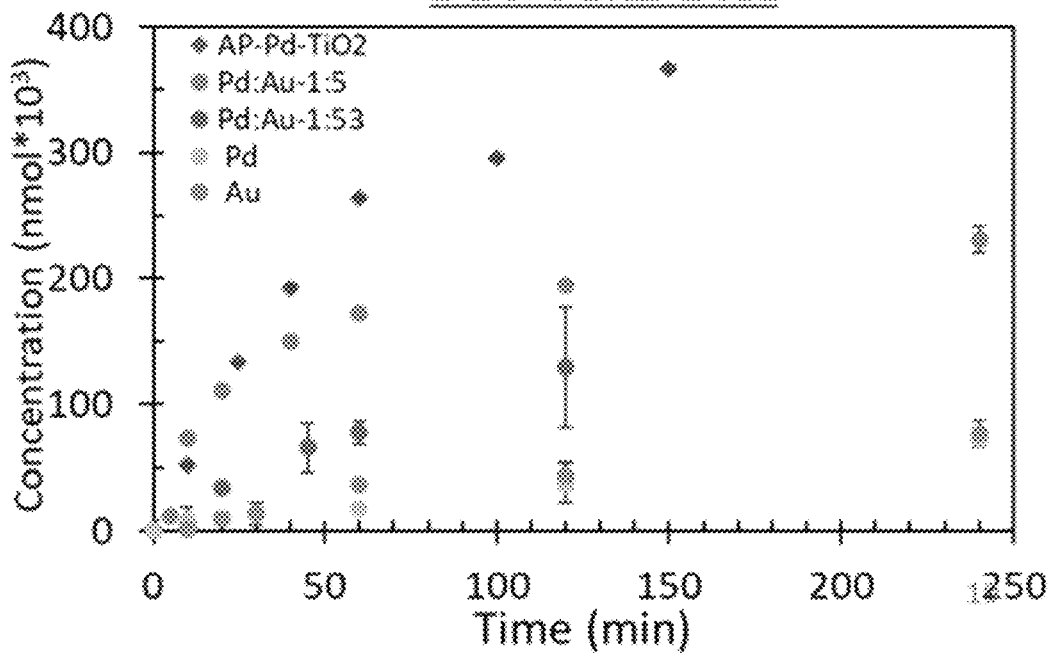
Figure 11:
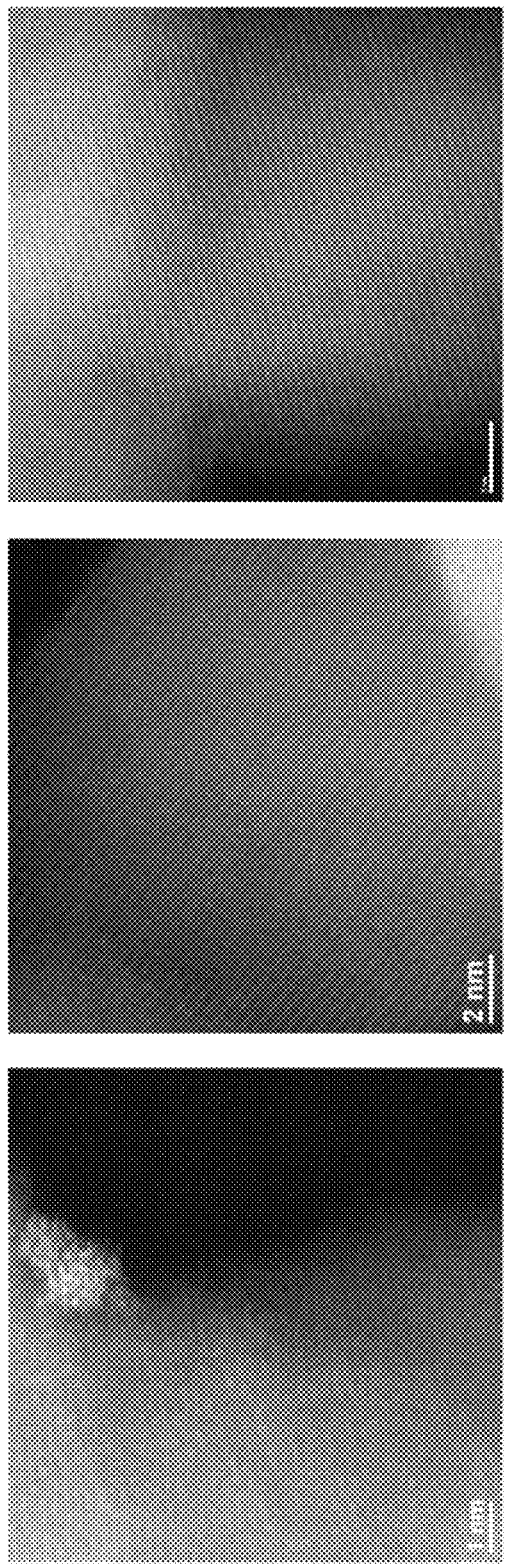
FIG. 11 shows an EM image of 1.5 wt % $Pt/TiO_2$.

Reaction Conditions, as shown by FIGS. 10A and 10B, may be Temperature: 160° C., Catalyst amount: 106 mg, Pressure: 50 psi Reactant amount: 50 ml, Agitation speed: 400 rpm, and Solvent: none.

Heterogeneous single atom catalysts have tremendous potential but a facile synthesis at high metal loadings remains a challenge. Herein, we present a simple, scalable method for doing so, applicable to a wide variety of metals and carbon and oxide supports. The method of "chelate fixation" or CheFi, prevents precursor agglomeration during drying and reduction caused by the presence of water. A non-soluble chelating agent dissolved in a polar solvent with higher dipole moment of water can replace water and fixate the precursor ions during activation of the catalyst. The CheFi method can yield relatively high loadings of single atoms, up to at least 1 atom per nm$^2$. In this manner, CheFi applied to a carbon support with a surface area of 1200 m$^2$/g has yielded 30 wt % Pt as single isolated atoms. This density is achievable over other carbons including those with no functional groups (diamond powder) as well as on oxide supports.

Supported single-atom catalysts (SACs) are at the frontier of catalysis research, promising the combined advantages of homogeneous (e.g., well-defined site, high selectivity) and heterogeneous (e.g., high stability, easy separation) catalysts. Such well-defined materials have the potential to provide unique catalytic performance due to the intimate electronic interaction between the isolated active site and a given support material. Examples of such materials include preferential oxidation of CO in hydrogen-rich fuel reported on a 2 wt % Pt SAC (see, S. Cao, Y. Zhao, S. Lee, S. Yang, J. Liu, G. Giannakakis, M. Li, M. Ouyang, D. Wang, E. C. H. Sykes, M. Flytzani-Stephanopoulos, High-loading single Pt atom sites [Pt—O(OH)<em><sub>x</sub></em>] catalyze the CO PROX reaction with high activity and selectivity at mild conditions. *Sci. Adv.* 6, eaba3809 (2020)), highly active, selective, and coke-resistant Rh single-atom catalyst dispersed in Cu for low-temperature nonoxidative propane dehydrogenation (see R. T. Hannagan, G. Giannakakis, R. Réocreux, J. Schumann, J. Finzel, Y. Wang, A. Michaelides, P. Deshlahra, P. Christopher, M. Flytzani-Stephanopoulos, M. Stamatakis, E. C. H. Sykes, Science (80.), in press, doi:10.1126/science.abg8389 and S. Sun, G. Sun, C. Pei, Z.-J. Zhao, J. Gong, Origin of Performances of Pt/Cu Single-Atom Alloy Catalysts for Propane Dehydrogenation. *J. Phys. Chem. C* (2021), doi: 10.1021/acs.jpcc.1c04295), and a stable heterogeneous single-atom Pd catalyst supported on graphitic carbon nitride for Suzuki coupling (see, Z. Chen, E. Vorobyeva, S. Mitchell, E. Fako, M. A. Ortuño, N. López, S. M. Collins, P. A. Midgley, S. Richard, G. Vilé, J. Pérez-Ramirez, A heterogeneous single-atom palladium catalyst surpassing homogeneous systems for Suzuki coupling. *Nat. Nanotechnol.* 13, 702-707 (2018)). A general limitation in these studies has been the inability to produce loadings of accessible single atoms that are relevant to industrial applications (L. Chen, R. R. Unocic, A. S. Hoffman, J. Hong, A. H. Braga, Z. Bao, S. R. Bare, J. Szanyi, Unlocking the Catalytic Potential of TiO2-Supported Pt Single Atoms for the Reverse Water-Gas Shift Reaction by Altering Their Chemical Environment. *JACS Au.* 1, 977-986 (2021)). In addition, in order to produce and retain isolated single metal atom sites in the resulting materials, novel and/or complicated synthesis methods have been employed (see, Y. Chen, S. Ji, Y. Wang, J. Dong, W. Chen, Z. Li, R. Shen, L. Zheng, Z. Zhuang, D. Wang, Isolated Single Iron Atoms Anchored on N-Doped Porous Carbon as an Efficient Electrocatalyst for the Oxygen Reduction Reaction. Angew. *Chem., Int. Ed.* 56, 6937 (2017), W. Zhong, R. Sa, L. Li, Y. He, L. Li, J. Bi, Z. Zhuang, Y. Yu, Z. Zou, A Covalent Organic Framework Bearing Single Ni Sites as a Synergistic Photocatalyst for Selective Photoreduction of CO2 to CO. *J. Am. Chem. Soc.* 141, 7615-7621 (2019), C. Gao, S. Chen, Y. Wang, J. Wang, X. Zheng, J. Zhu, L. Song, W. Zhang, Y. Xiong, Heterogeneous Single-Atom Catalyst for Visible-Light-Driven High-Turnover CO2 Reduction: The Role of Electron Transfer. *Adv. Mater.* 30, 1704624 (2018), Y. J. Sa, D.-J. Seo, J. Woo, J. T. Lim, J. Y. Cheon, S. Y. Yang, J. M. Lee, D. Kang, T. J. Shin, H. S. Shin, H. Y. Jeong, C. S. Kim, M. G. Kim, T.-Y. Kim, S. H. Joo, A General Approach to Preferential Formation of Active Fe-Nx Sites in Fe-N/C Electrocatalysts for Efficient Oxygen Reduction Reaction. *J. Am. Chem. Soc.* 138, 15046-15056 (2016), K. Jiang, B. Liu, M. Luo, S. Ning, M. Peng, Y. Zhao, Y.-R. Lu, T.-S. Chan, F. M. F. de Groot, Y. Tan, Single platinum atoms embedded in nanoporous cobalt selenide as electrocatalyst for accelerating hydrogen evolution reaction. Nat. Commun. 10, 1743 (2019), X. Ge, P. Zhou, Q. Zhang, Z. Xia, S. Chen, P. Gao, Z. Zhang, L. Gu, S. Guo, Palladium Single Atoms on TiO 2 as a Photocatalytic Sensing Platform for Analyzing the Organophosphorus Pesticide Chlorpyrifos. Angew. Chemie. 132, 238-242 (2020), S. Sun, G. Zhang, N. Gauquelin, N. Chen, J. Zhou, S. Yang, W. Chen, X. Meng, D. Geng, M. N. Banis, R. Li, S. Ye, S. Knights, G. A. Botton, T.-K. Sham, X. Sun, Single-atom Catalysis Using Pt/Graphene Achieved through Atomic Layer Deposition. *Sci. Rep.* 3, 1775 (2013), H. Wei, K. Huang, D. Wang, R. Zhang, B. Ge, J. Ma, B. Wen, S. Zhang, Q. Li, M. Lei, C. Zhang, J. Irawan, L.-M. Liu, H. Wu, Iced photochemical reduction to synthesize atomically dispersed metals by suppressing nanocrystal growth. *Nat. Commun.* 8, 1490 (2017), Y. Yao, Z. Huang, P. Xie, L. Wu, L. Ma, T. Li, Z. Pang, M. Jiao, Z. Liang, J. Gao, Y. He, D. J. Kline, M. R. Zachariah, C. Wang, J. Lu, T. Wu, T. Li, C. Wang, R. Shahbazian-Yassar, L. Hu, High temperature shockwave stabilized single atoms. *Nat. Nanotechnol.* 14, 851-857 (2019), and H. Adabi, A. Shakouri, N. Ul Hassan, J. R. Varcoe, B. Zulevi, A. Serov, J. R. Regalbuto, W. E. Mustain, High-performing commercial Fe—N—C cathode electrocatalyst for anion-exchange membrane fuel cells. *Nat. Energy.* 6, 834-843 (2021)). To fully exploit the potential for commercial applications of SACs, the development of scalable and facile synthesis methods that can produce high loadings of isolated active sites is required.

There are many synthetic methods available to deliver metal precursors to catalytic supports (i.e., oxides, carbon). For example, strong electrostatic adsorption (SEA), ensures an even distribution of metal ions on the support surface through control of solution pH (see, W. A. Spieker, J. Liu, X. Hao, J. T. Miller, A. J. Kropf, J. R. Regalbuto, An EXAFS study of the coordination chemistry of hydrogen hexachloroplatinate (IV): 2. Speciation of complexes adsorbed onto alumina. *Appl. Catal. A Gen.* 243, 53-66 (2003); A. Wong, Q. Liu, S. Griffin, A. Nicholls, J. R. Regalbuto, Synthesis of ultrasmall, homogeneously alloyed, bimetallic nanoparticles on silica supports. *Science* (80-.). 358, 1427-1430 (2017); L. Jiao, J. R. Regalbuto, The synthesis of highly dispersed noble and base metals on silica via strong electrostatic adsorption: I. Amorphous silica. J. Catal. 260, 329-341 (2008), S. Lambert, N. Job, L. D'Souza, M. F. R. Pereira, R. Pirard, B. Heinrichs, J. L. Figueiredo, J.-P. Pirard, J. R. Regalbuto, Synthesis of very highly dispersed platinum catalysts supported on carbon xerogels by the strong electrostatic adsorption method. *J. Catal.* 261, 23-33 (2009)). This method can reliably produce small metal nanoparticles (see Wen xiong, B. Mehrabadi, S. G. Karakalos, R. White, A. Shakouri, P. Kasak, S. J. Zaidi, J. Weidner, J. R. Regalbuto, H. R. Colon-Mercado, J. R. Monnier, Enhanced performance of oxygen-functionalized, multi-walled carbon nanotubes as support for Pt and Pt—Ru bimetallic catalysts for methanol electrooxidation. *ACS Appl. Energy Mater.* (2020), doi:10.1021/acsaem.0c00477 and B. A. T. Mehrabadi, R. White, A. Shakouri, J. R. Regalbuto, J. W. Weidner, J. R. Monnier, Ruthenium-platinum bimetallic catalysts with controlled surface compositions and enhanced performance for methanol oxidation. *Catal. Today.* 334 (2019), doi: 10.1016/j.cattod.2018.11.042.), as well as isolated single atoms if the metal loading is low enough (see, J. Resasco, P. Christopher, Atomically Dispersed Pt-group Catalysts: Reactivity, Uniformity, Structural Evolution, and Paths to Increased Functionality. *J. Phys. Chem. Lett.* 11, 10114-10123 (2020) and L. DeRita, S. Dai, K. Lopez-Zepeda, N. Pham, G. W. Graham, X. Pan, P. Christopher, Catalyst Architecture for Stable Single Atom Dispersion Enables Site-Specific Spectroscopic and Reactivity Measurements of CO Adsorbed to Pt Atoms, Oxidized Pt Clusters, and Metallic Pt Clusters on TiO2. *J. Am. Chem. Soc.* 139, 14150 (2017)). However, at loadings greater than ~0.1 wt %, activation of such catalysts (i.e, through calcination and/or reduction treatments) results in cluster and nanoparticle formation (see, J. Zhang, C. Asokan, G. Zakem, P. Christopher, J. W. Medlin, Enhancing Sintering Resistance of Atomically Dispersed Catalysts in Reducing Environments with Organic Monolayers. *Green Energy Environ.* (2021), doi:https://doi.org/10.1016/j.gee.2021.01.022). One strategy to achieve high single metal atom loadings involves the use of chelating agents that complex with the metal precursor and are then pyrolyzed (sometimes along with other organic components) to produce a carbon material with single metal atoms dispersed throughout. However, there are some concerns that not all of the single atoms in such a carbon support matrix are accessible (see, W. Chen, X. Luo, T. J. A. Slater, Y. Zhou, S. Ling, R. Bao, J. Alves Fernandes, J. Wang, Y. Shen, General synthesis of single atom electrocatalysts via a facile condensation-carbonization process. *J. Mater. Chem. A.* 8, 25959-25969 (2020)), and the approach is limited to carbon supports.

Recently, Hutchings and co-workers reported promising results using non-aqueous organic solvents to deliver metal salt and organometallic precursors to a carbon support surface. They were able to achieve single atom species up to a loading of 1 wt % for Au, Pt, Pd and Ru, and demonstrated their efficacy for acetylene hydrochlorination. Due to the instability of the employed precursors in aqueous solution, "extra dry" organic solvents had to be employed (X. Sun, S. R. Dawson, T. E. Parmentier, G. Malta, T. E. Davies, Q. He, L. Lu, D. J. Morgan, N. Carthey, P. Johnston, S. A. Kondrat, S. J. Freakley, C. J. Kiely, G. J. Hutchings, Facile synthesis of precious-metal single-site catalysts using organic solvents. *Nat. Chem.* 12, 560-567 (2020)). Indeed, solution removal at the last step of the incipient wetness impregnation before the catalyst activation has been reported to form crystallites because of weak interactions and redistribution of precursors ions (see, M. S. Kumar, M. Schwidder, W. Grünert, A. Brückner, On the nature of different iron sites and their catalytic role in Fe-ZSM-5 DeNOx catalysts: new insights by a combined EPR and UV/VIS spectroscopic approach. *J. Catal.* 227, 384-397 (2004), J. R. A. Sietsma, A. Jos van Dillen, P. E. de Jongh, K. P. de Jong, in Scientific Bases for the Preparation of Heterogeneous Catalysts, E. M. Gaigneaux, M. Devillers, D. E. De Vos, S. Hermans, P. A. Jacobs, J. A. Martens, P. B. T.-S. in S. S. and C. Ruiz, Eds. (Elsevier, 2006; https://www.sciencedirect.com/science/article/pii/S0167299106808955), vol. 162, pp. 95-102, and S. Haukka, E.-L. Lakomaa, T. Suntola, in Adsorption and its Applications in Industry and Environmental Protection, A. B. T.-S. in S. S. and C. Dąabrowski, Ed. (Elsevier, 1999; https://www.sciencedirect.com/science/article/pii/S0167299199805709), vol. 120, pp. 715-750). Even in the case of SEA, incomplete drying of the adsorbed precursors on the support during activation, see FIG. 16, results in the formation of large nanoparticles.

Figure 12:
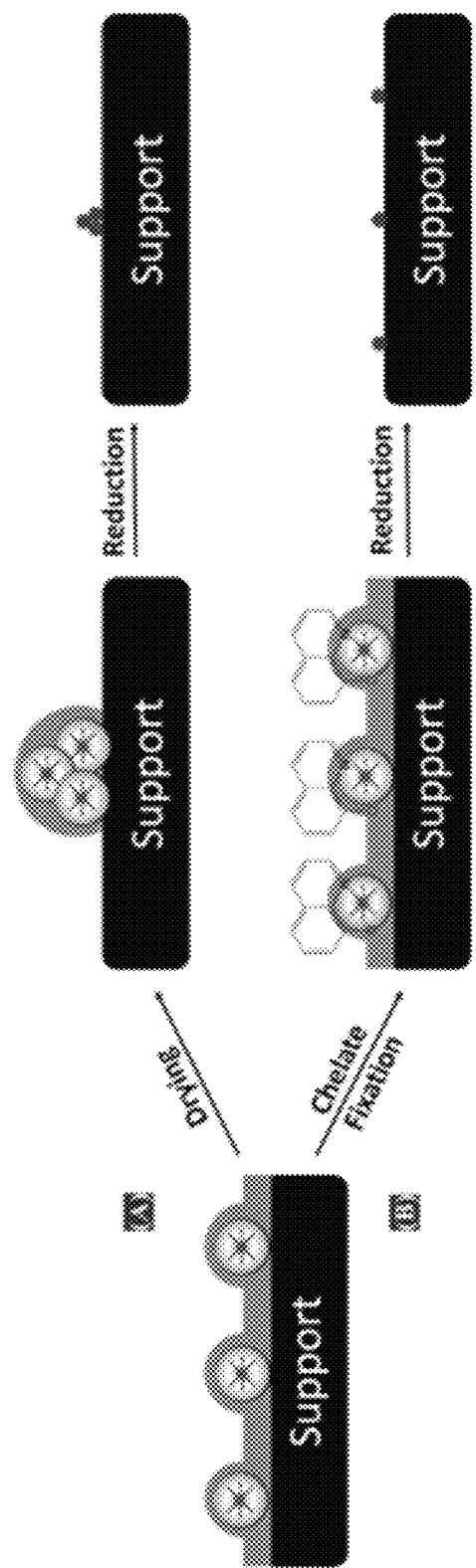
FIG. 12 shows a schematic of synthesis methods at: (A) effect of water during drying and activation of the catalyst; and (B) chelate fixation during drying and activation.

We hypothesized that formation of reduced metal clusters and particles (as opposed to single isolated atoms), even when starting with well-dispersed, adsorbed precursors obtained with SEA, is significantly influenced by the presence of water (see FIG. 12 at A). In addition to any bulk water that might remain in support pores even after drying, there is also a significant amount of water associated with each precursor in the form of a hydration sheath (see, X. Hao, W. A. Spieker, J. R. Regalbuto, A further simplification of the revised physical adsorption (RPA) model. *J. Colloid Interface Sci.* 267, 259-264 (2003), N. Santhanam, T. A. Conforti, W. Spieker, J. R. Regalbuto, Nature of metal catalyst precursors adsorbed onto oxide supports. *Catal. Today.* 21, 141-156 (1994), and J. Regalbuto, Ed., Catalyst Preparation (CRC Press, 2016; https://www.taylorfrancis.com/books/9781420006506). For example, $PtCl_6^{2-}$ is known to retain one hydration sheath, while $Pt(NH3)_4^{2+}$ is known to retain two hydration sheaths, even upon drying at room temperature.

In order to retard (or eliminate) the negative influence of such water on the formation of supported single atoms, a chelating agent was introduced immediately following the precursor adsorption step. This chelating agent, 8-hydroxyquinoline (8-HQ), has a high affinity for transition metals (see, M. R. Mlahi, E. M. Afsah, A. Negm, M. M. Mostafa, Synthesis of 8-hydroxyquinolium chloroacetate and synthesis of complexes derived from 8-hydroxyquinoline, and characterization, density functional theory and biological studies. *Appl. Organomet. Chem.* 29, 200-208 (2015), J. Martín, An overview on ligands of therapeutically interest. *Pharm. Pharmacol. Int. J.* 6 (2018), doi:10.15406/ppij.2018.06.00177, Rohini, K. Paul, V. Luxami, 8-Hydroxyquinoline Fluorophore for Sensing of Metal Ions and Anions. Chem. Rec. n/a (2020), doi:https://doi.org/10.1002/tcr.202000082, V. Prachayasittikul, V. Prachayasittikul, S. Prachayasittikul, S. Ruchirawat, 8-Hydroxyquinolines: a review of their metal chelating properties and medicinal applications. *Drug Des. Devel. Ther.,* 1157 (2013).), and has been shown to adsorb on a variety of carbon surfaces for application in metal extraction (see, V. Ravindran, M. R. Stevens, B. N. Badriyha, M. Pirbazari, Modeling the sorption of toxic metals on chelant-impregnated adsorbent. *AIChE J.* 45, 1135-1146 (1999), A. Sheikhmohammadi, S. M. Mohseni, R. khodadadi, M. Sardar, M. Abtahi, S. Mandavi, H. Keramati, Z. Dahaghin, S. Rezaei, M. Almasian, M. Sarkhosh, M. Faraji, S. Nazari, Application of graphene oxide modified with 8-hydroxyquinoline for the adsorption of Cr (VI) from wastewater: Optimization, kinetic, thermodynamic and equilibrium studies. *J. Mol. Liq.* 233, 75-88 (2017), W. Guo, X. Meng, Y. Liu, L. Ni, Z. Hu, R. Chen, M. Meng, Y. Wang, J. Han, M. Luo, Synthesis and application of 8-hydroxyquinoline modified magnetic mesoporous carbon for adsorption of multivariate metal ions from aqueous solutions. *J. Ind. Eng. Chem.* 21, 340-349 (2015).).

Figure 16:
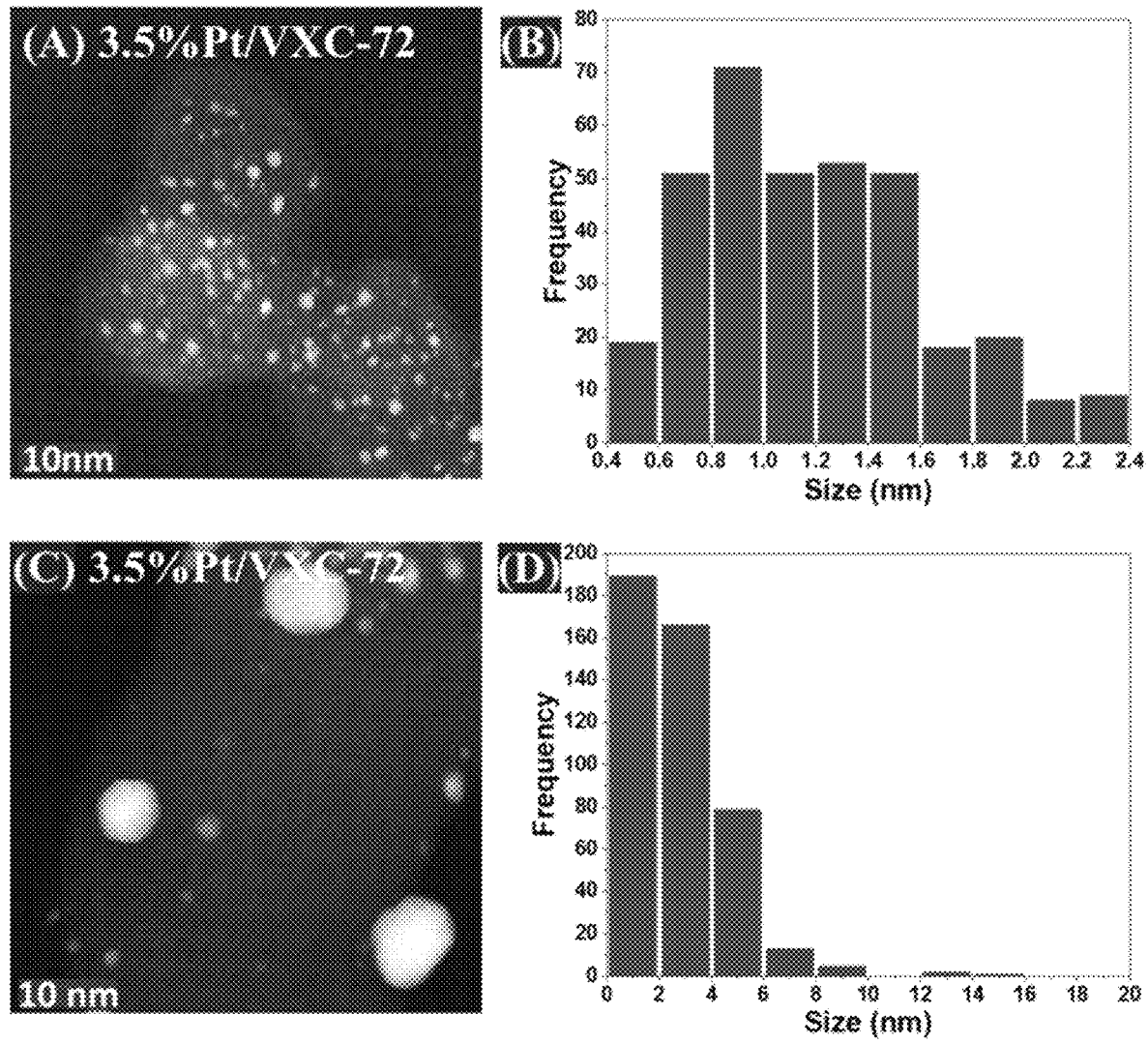
FIG. 16 shows excess water effect in the system during activation: (A) AC-STEM image of 3.5% Pt/VXC-72 prepared by SEA and well dried at room temperature before activation; (B) corresponding particle size distribution; (C) 3.5% Pt/VXC-72 prepared by SEA; activation started in the form of moist mud with excess water; and (D) corresponding particle size distribution of (C).
Figure 17:
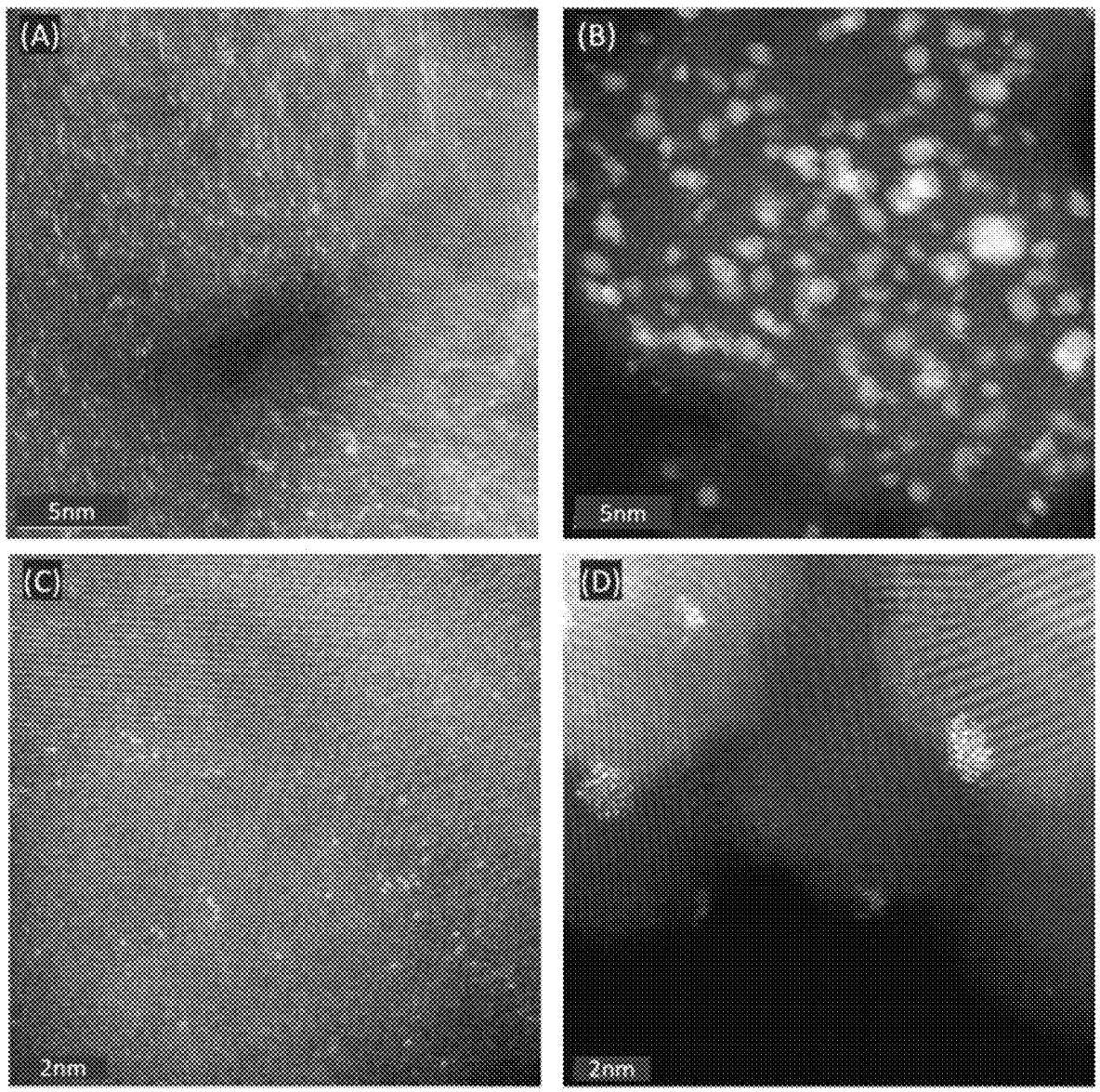
FIG. 17 shows AC-STEM images of: (A) 3.5% Pt/VXC-72 CheFi; (B) 3.5% Pt/VXC-72 SEA; (C) 1.9% Pt/TiO2 CheFi; and (D) 1.9% Pt/TiO2 SEA catalysts.
Figure 18:
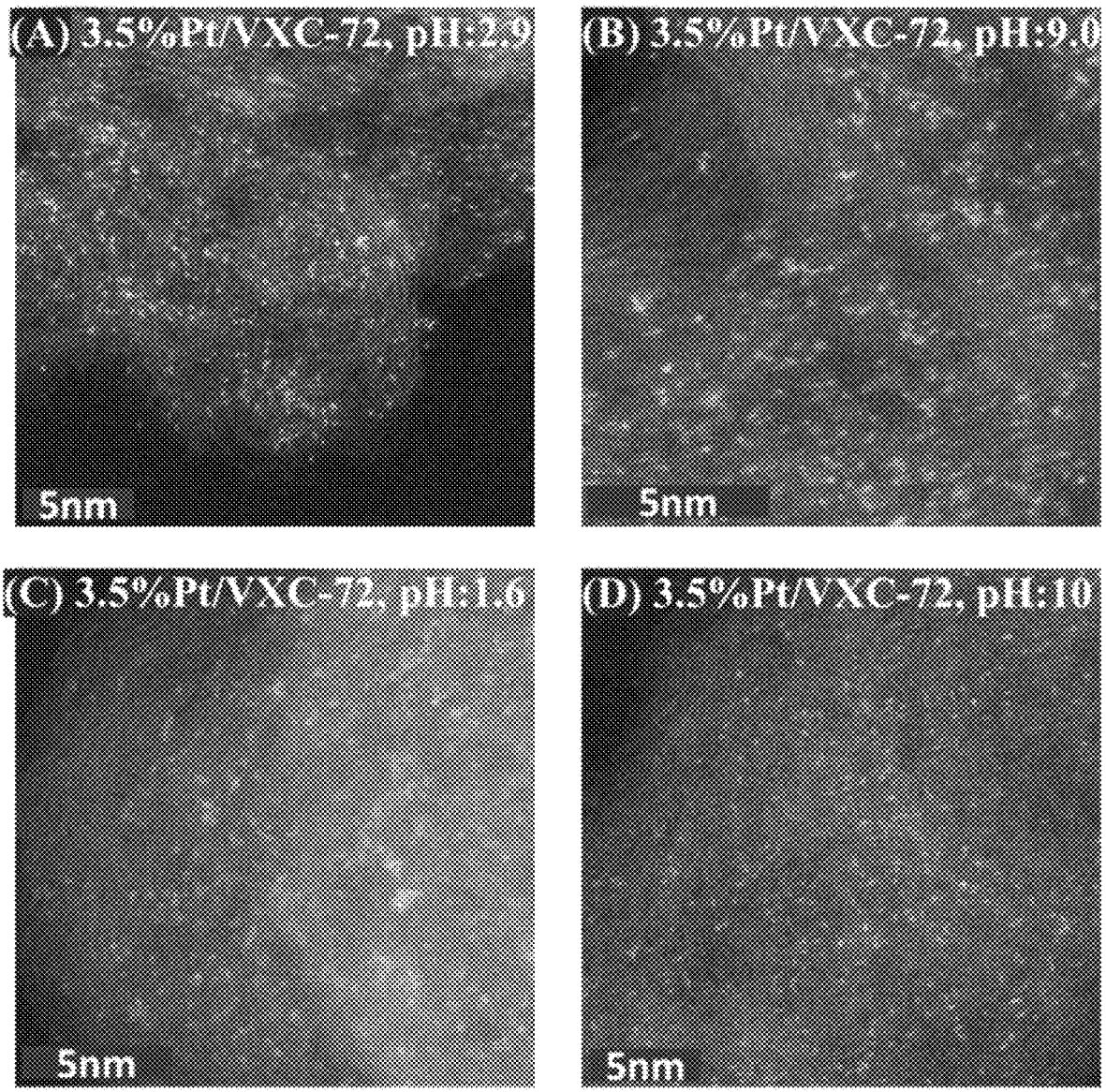
FIG. 18 shows STEM images of: (A) SEA/CheFi catalyst ($H_2PtCl_6$); (B) CheFi catalyst with anionic precursor ($H_2PtCl_6$); (C) CheFi with high ionic strength of anionic precursor ($H_2PtCl_6$); and (D) CheFi catalyst with cationic precursor ($Pt(NH_3)_4NO_3$).

We surmised that 8-HQ, which is not soluble in water, will anchor the metal precursor on the support surface (FIG. 12 at B). The strong metal-8-HQ interaction coupled and high boiling point of 8-HQ (267° C.), would then allow the metal ion to be reduced with $H_2$, while avoiding formation of clusters or nanoparticles. [A comparison of SEA with this new chelate fixation (CheFi) method, with SEA alone, for Pt on VXC-72 and $TiO_2$ support substrates is provided in FIG. 17. It can be seen that there is significant particle/cluster formation for the SEA sample upon reduction in $H_2$ at 300° C., albeit with a very tight particle size distribution (FIG. 16 at B). However, for the CheFi sample, the sample primarily consists of isolated single atoms, along with few agglomerates as dimers, trimers, etc. It was further found that SEA was not necessary for the CheFi method to be successful. A set of experiments conducted at pH 2.9 over a VXC-72 support (where maximum SEA of the Pt precursor occurs) and 9 (the point of zero charge of the VXC-72 where there is no SEA) shows identical results (FIG. 18 at A-B). In addition, contrary to SEA, the CheFi synthesis method proved successful at high ionic strength using both anionic and cationic Pt precursors (see, FIG. 18 at C-D).]

In this contribution, we demonstrate that this proposed chelate fixation (CheFi) method produces high densities (up to at least ~1 atom/$nm^2$) of isolated single atoms of Pt on a variety of carbon supports (carbon black, activated carbon, diamond), as well as $TiO_2$ and $SiO_2$. In addition, the method has been demonstrated for other catalytically important transition metals (e.g., Ir, Ru). The results open up a simple, cheap and scalable method to produce SACs, for both fundamental catalysis studies and practical industrial applications.

Figure 13:
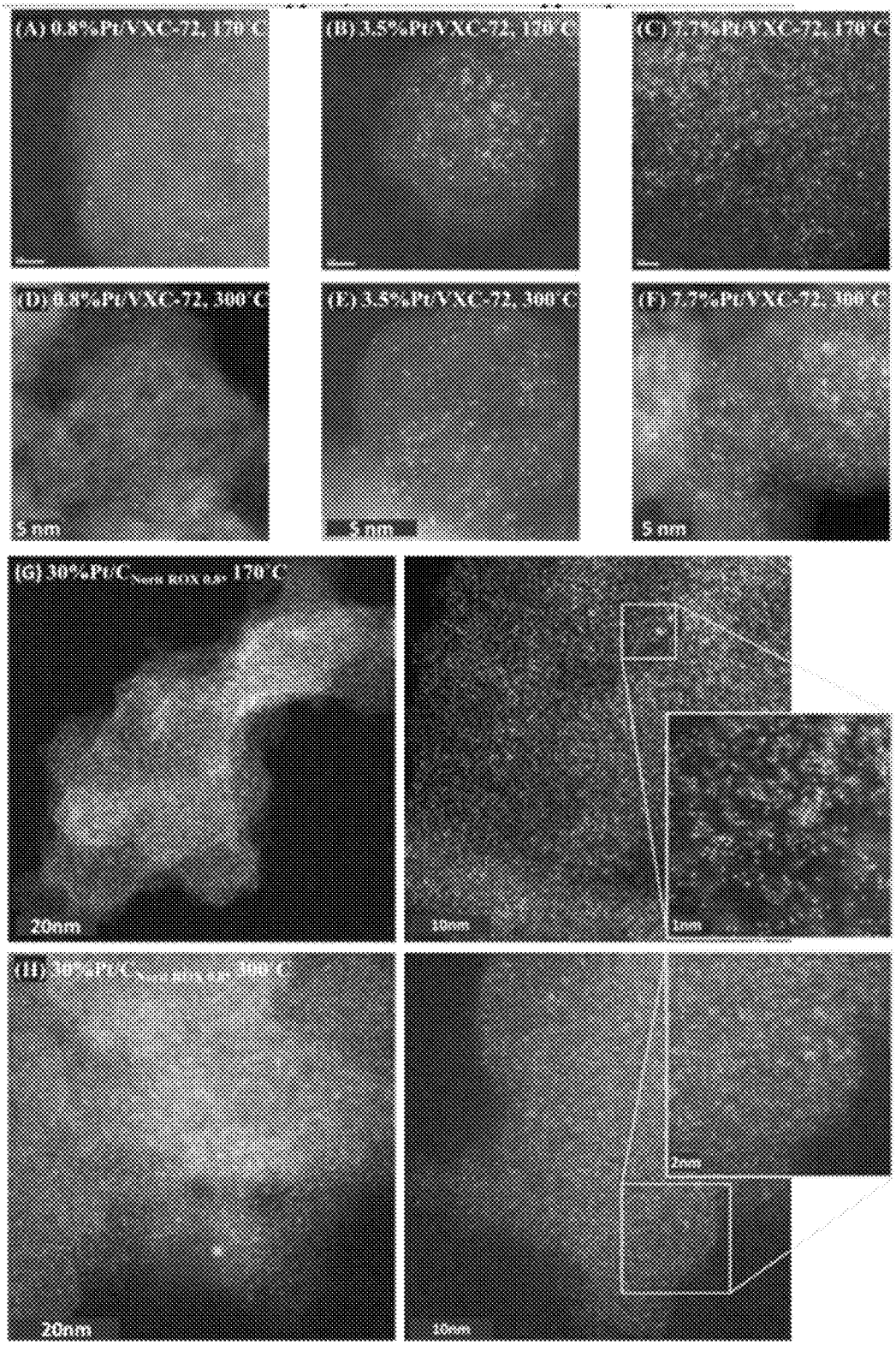
FIG. 13 shows AC-STEM images of 0.8% Pt/VXC-72 CheFi, 3.5%Pt/VXC-72 CheFi, 7.7%Pt/VXC-72 (1 Pt atom/nm2) CheFi reduced at (A-C) 170° C., and (D-F) 300° C., 30%Pt/CNorit (1 Pt atom/nm2) CheFi-reduced at (G) 170° C., and (H) 300° C.
Figure 19:
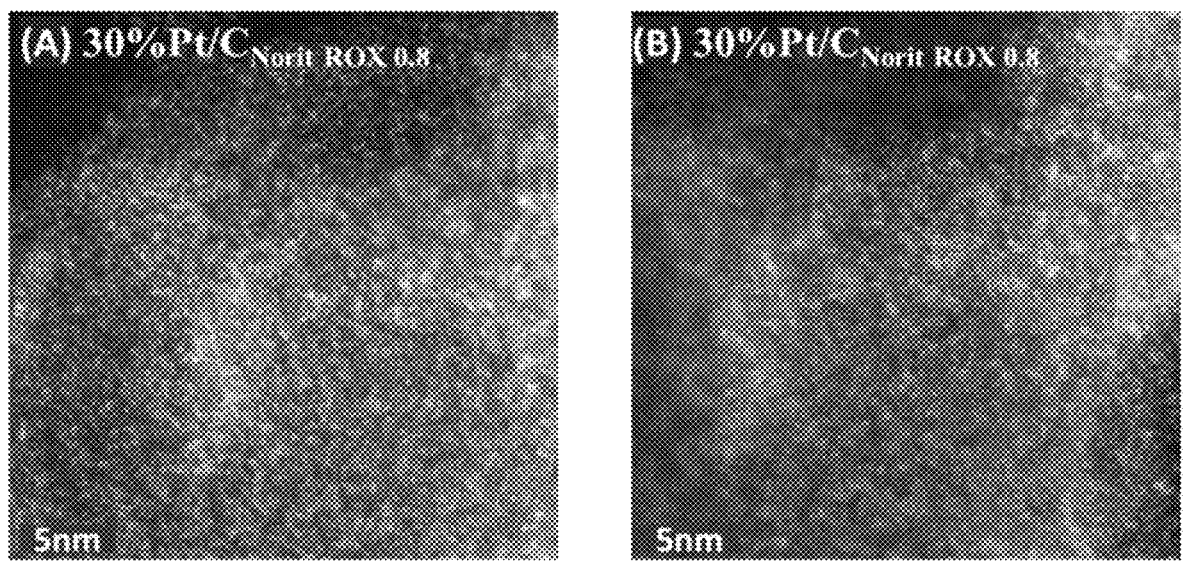
FIG. 19 shows same frame AC-STEM images explaining contrast signal overlap in different focal planes at: (A) 30% Pt/C CheFi catalyst with the focus on the left-hand side; and (B) 30% Pt/C CheFi catalyst with the focus on the right hand-side.

Aberration corrected scanning transmission electron microscopy (AC-STEM) has been used to characterize the samples. FIG. 13 at A-F show the images of CheFi-prepared 0.8% Pt/VXC-72, 3.5% Pt/VXC-72, and 7.7% Pt/VXC-72 corresponding to densities of 0.1, 0.45 and 1.0 atom/$nm^2$. With a reduction temperature of 170° C. (FIG. 13 at A-C) the atoms are seen to be completely isolated, while a higher reduction at 300° C. causes a small amount of agglomeration at the highest metal loading (FIG. 13 at F). Applying 1 atom/$nm^2$ on a Norit ROX carbon with a surface area of 1200 $m^2$/g resulted in 30% Pt/C SACs shown in FIG. 13 at G-H. The higher resolution images show well distributed single atoms. The zoomed inset emphasizes the contrast signal overlap from single atoms in different focal planes as a white haze below and above the single atoms in focus. The higher temperature reduction (300° C.) again causes a slight amount of agglomeration (FIG. 13 at H). As some blurring is caused by the three-dimensional sample not all being in the focal plane, this was further explored. FIG. 19 shows the same area with either the left-hand focused (see FIG. 19 at A) or the right-hand (FIG. 19 at B). Atoms are clearly resolved when any section of the sample is brought into focus. Such imaging strongly suggests that the metal atoms are not only present on the outer surface of the support, but within the support pore framework.

Figure 20:
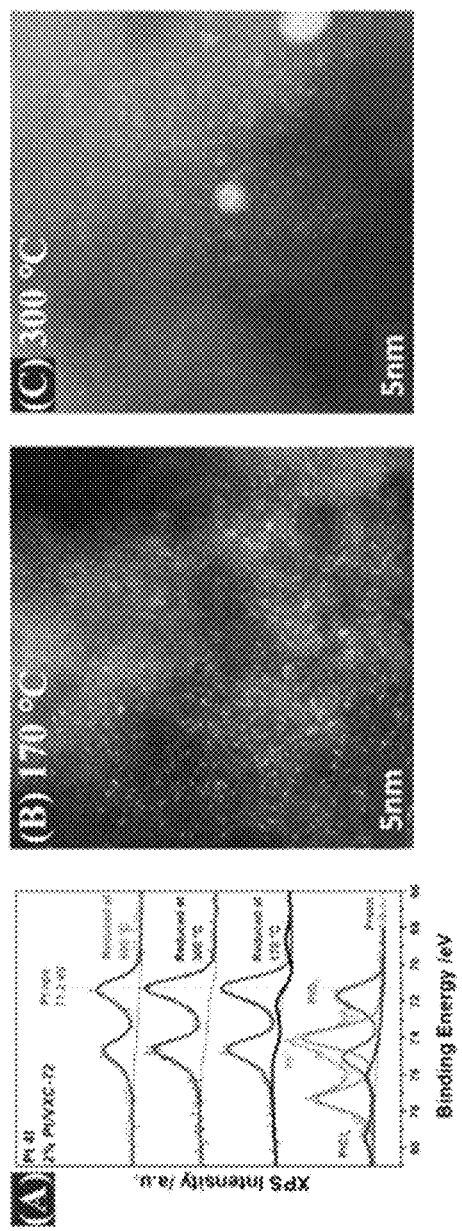
FIG. 20 shows in situ XPS and AC-STEM images: (A) XPS spectra of fresh, reduced at 170° C., 300° C., and 600° C. 2% Pt/VXC-72 nanoparticles; (B) STEM image of 2% Pt/VXC-72 prepared by CheFi in situ reduced at 170° C.; and (C) STEM image of 2% Pt/VXC-72 prepared by CheFi in situ reduced at 300° C.

Further characterization has been performed with XPS and CO-temperature programmed desorption. The in-situ XPS measurement of Pt 4f peaks of 2% Pt/VXC-72 prepared by standard dry impregnation before reduction in hydrogen is shown in FIG. 20 at A, and contain several species of Pt, including $PtO_x$ at 72 eV, Pt4+ at 72.9 eV, and $PtCl_6$ at 75.7 eV. After an in situ reduction at 300° C. only one Pt species peak at 71.2 eV is observed, and is associated with the Pt 4f of metallic Pt nanoparticles (see, A. J. Therrien, A. J. R. Hensley, M. D. Marcinkowski, R. Zhang, F. R. Lucci, B. Coughlin, A. C. Schilling, J.-S. McEwen, E. C. H. Sykes, An atomic-scale view of single-site Pt catalysis for low-temperature CO oxidation. Nat. Catal. 1, 192-198 (2018)). Indeed, reduction of the sample to 600° C. resulted in the same position of the Pt 4f peak, confirming it as a reference for Pt nanoparticles. A 2% Pt/VXC-72 catalyst prepared using CheFi showed different species of Pt in as received sample demonstrated in FIG. 14 at A and after in situ reduction at 170° C., 300° C., and 600° C. Pt 4f peak showed up at the characteristic position of 71.2 eV for nanoparticles and 72.4 eV for single atoms. Before reduction at 600° C., the catalyst was reduced at 170° C., with the XPS spectrum shown in FIG. 14 at A. This corresponds to STEM images (FIG. 20 at B) revealing only single Pt atoms, with the associated Pt 4f peak shifted to 72.4 eV (see, H. Zhang, P. An, W. Zhou, B. Y. Guan, P. Zhang, J. Dong, X. W. (David) Lou, Dynamic traction of lattice-confined platinum atoms into mesoporous carbon matrix for hydrogen evolution reaction. Sci. Adv. 4, eaao6657 (2018)). The small peak at 70.9 eV is attributed to formation of single atom Pt carbide atoms (see, B. K. Vu, M. B. Song, S.-A. Park, Y. Lee, I. Y. Ahn, Y.-W. Suh, D. J. Suh, W.-I. Kim, H.-L. Koh, Y. G. Choi, E. W. Shin, Electronic density enrichment of Pt catalysts by coke in the propane dehydrogenation. Korean J. Chem. Eng. 28, 383-387 (2011)). The sample reduced at 300° C. demonstrated two Pt 4f peaks at both 71.2 and 72.4 eV, associated with nanoparticles and single atoms, as seen in the associated STEM images (FIG. 20 at C). The 30% Pt/CNorit fresh catalyst was slightly more oxidized than the fresh 2% Pt/VXC-72 shown in FIG. 14 at B. The 30% Pt/CNorit catalyst reduced at 100° C. resulted in a single specie associated with single atoms while reduction at 170° C. resulted in coordination of single atoms together because of high density of single atoms (FIG. 13 at G). A higher temperature reduction at 300° C. resulted in coordination of all Pt atoms and formation of very small clusters shown in FIG. 13 at H.

Figure 14:
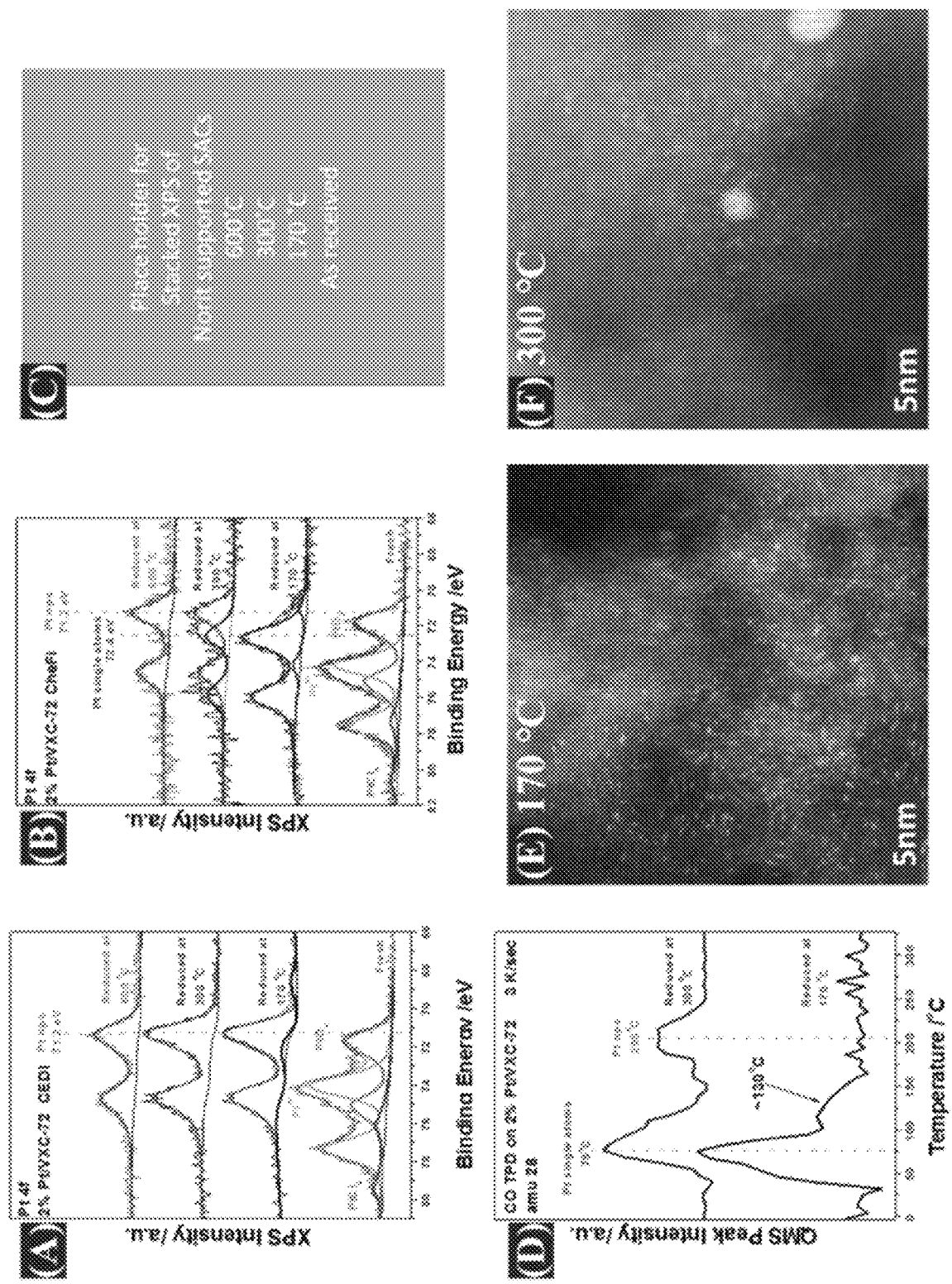
FIG. 14 shows in situ XPS spectra of fresh, reduced at 170° C., 300° C., and 600° C. (A) 2%Pt/VXC-72 nanoparticles, (B) 2%Pt/VXC-72 CheFi, (C) 30%Pt/ C CheFi, (D) CO-TPD of 2%Pt/VXC-72 CheFi in situ reduced at 170° C. and 300° C., (E) STEM image of 2%Pt/VXC-72 prepared by CheFi in situ reduced at 170° C. (F) STEM image of 2%Pt/VXC-72 prepared by CheFi in situ reduced at 300° C.

Temperature programmed desorption of CO (CO-TPD) can further distinguish between SACs and catalysts containing nanoparticles (see, J. Hulva, M. Meier, R. Bliem, Z. Jakub, F. Kraushofer, M. Schmid, U. Diebold, C. Franchini, G. S. Parkinson, Science (80-.), in press, doi:10.1126/science.abe5757.). The results in FIG. 14 at C demonstrate the difference in CO desorption temperature from SACs and catalyst containing both SACs and nanoparticles. The bottom (black) curve shows CO desorption profile from the 2% Pt/VXC-72 catalyst that was first reduced at 170° C. A main CO desorption peak appears at 350K, and is attributed to desorption from single Pt atoms. A small shoulder at 400 K can be attributed to the Pt carbide in the catalyst, consistent with the XPS results (see, B. K. Vu, M. B. Song, S.-A. Park, Y. Lee, I. Y. Ahn, Y.-W. Suh, D. J. Suh, W.-I. Kim, H.-L. Koh, Y. G. Choi, E. W. Shin, Electronic density enrichment of Pt catalysts by coke in the propane dehydrogenation. Korean J. Chem. Eng. 28, 383-387 (2011)). The top (blue) curve shows the CO desorption profile for the 2% Pt/VXC-72 catalyst reduced at 300° C. Desorption peaks are observed at 350K and 480K, and arise from single atoms and nanoparticles, respectively. These observations are once again consistent with the AC-STEM images of the catalyst treated at 170° C. (FIG. 20 at B) and 300° C. (FIG. 20 at C). Since a large fraction of Pt atoms is inside the nanoparticles and are not accessible to adsorb CO, the intensity of the CO desorption peak is much smaller than the peak from single atoms. FIG. 14 at D (blue) demonstrate CO-TPD of 30% Pt/CNorit reduced at 100° C. resulting in majority of single atom confirming the XPS results (see, FIG. 14 at B). Further reduction at 170° C. resulted in the majority of Pt atoms coordination into dimers, trimers, and ultrasmall clusters resulted in CO desorption at higher temperatures (FIG. 14 at D dark green). The CO-TPD of 30% Pt/CNorit reduced at 300° C. showed formation of more small nanoparticles (FIG. 13 at H) resulted in CO desorption at slightly higher temperature close to the CO desorption temperature from nanoparticles (FIG. 14 at D light green).

Because the chelating agent is not soluble in water a polar solvent like acetone is needed to dissolve the chelating agent and with a dipole moment higher than water, replaces water to facilitate the chelating process. The presence of water in the system exerts a repulsive force on the chelated complex of metal ion to the more stable surface of the solid support during activation and results in immobility of the catalyst precursor complex.

Figure 15:
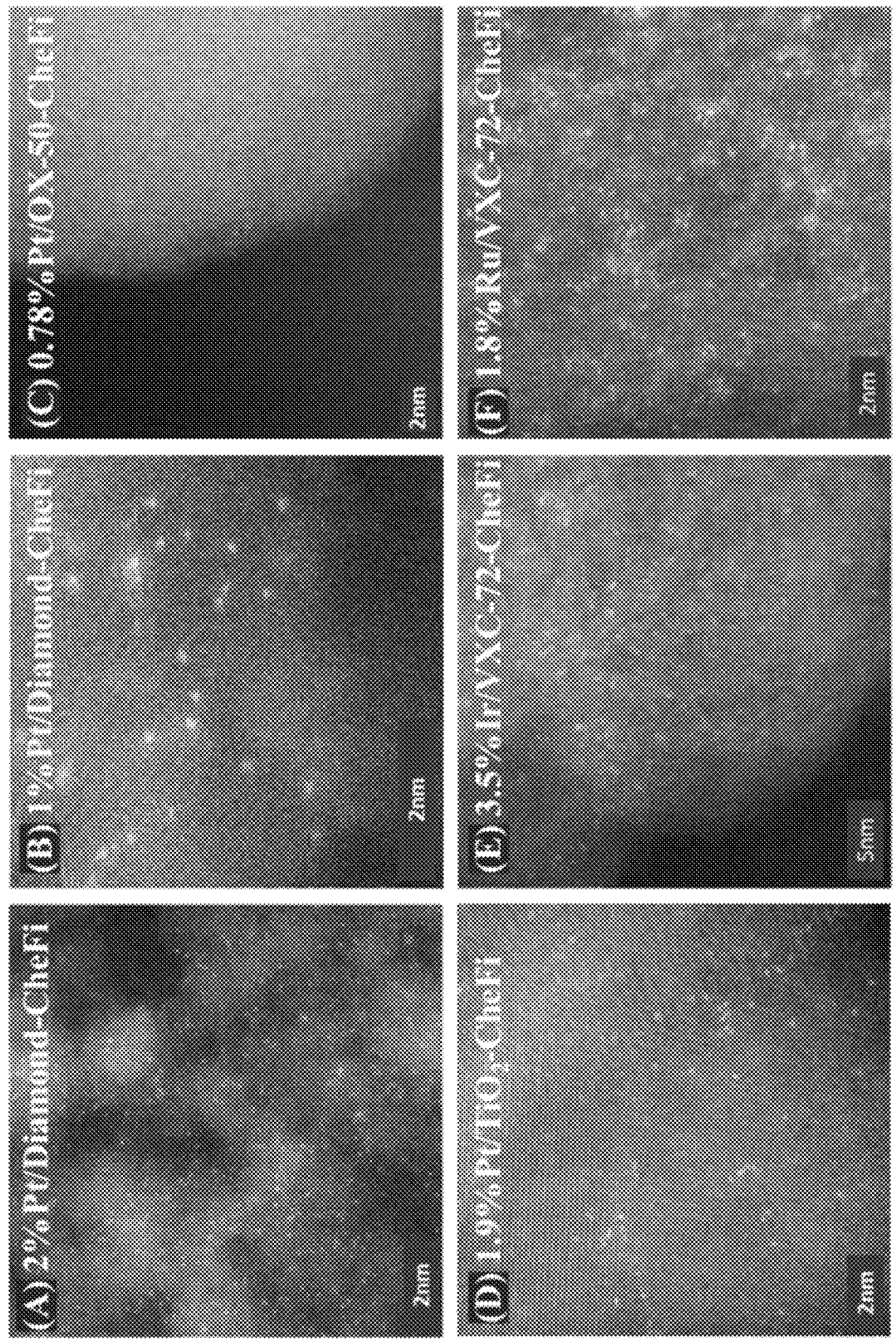
FIG. 15 shows versatility of the CheFi method at: (A) 2% Pt/Diamond (platinum nitrate precursor); (B) 1% Pt/Diamond; and (C) 0.78% Pt/SiO2, (D) 1.9% Pt/TiO2, 3.5% Ir/VXC-72, and 1.8% Ru/VXC-72.
Figure 21:
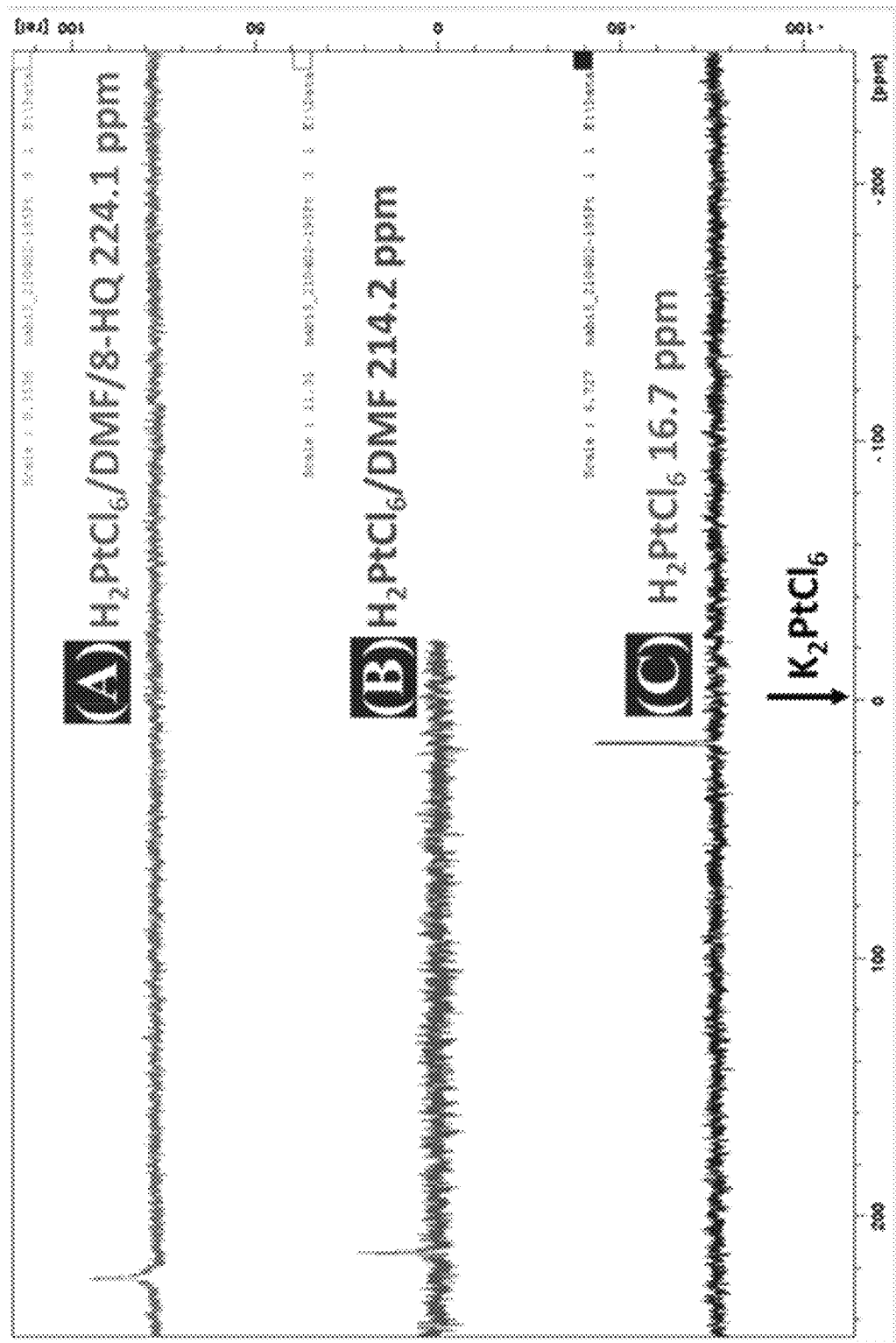
FIG. 21 shows NMR study of chelating Pt complex, the $K_2PtCl_6$ used as reference, (A) 8-HQ/DMF/aqueous chloroplatinic acid Pt peak at 224.1 ppm (B) DMF/aqueous chloroplatinic acid Pt peak at 214.2 ppm, and (C) aqueous chloroplatinic acid Pt peak observed at 16.7 ppm, addition of DMF solvent shifted the Pt peak to 214.2, 8-HQ/DMF addition Pt peak

The CheFi method appears to be applicable to a variety of transition metals, regardless of the presence of ligands in the precursors. The 8-HQ can chelate metal ions (see, K. K. Zborowski, M. Solá, J. Poater, L. M. Proniewicz, Aromatic properties of 8-hydroxyquinoline and its metal complexes. Cent. Eur. J. Chem. 11, 655-663 (2013)) or metal ion complexes with ligands (see, R. J. Warr, A. N. Westra, K. J. Bell, J. Chartres, R. Ellis, C. Tong, T. G. Simmance, A. Gadzhieva, A. J. Blake, P. A. Tasker, M. Schröder, Selective Extraction and Transport of the [PtCl6]2—Anion through Outer-Sphere Coordination Chemistry. Chem.—A Eur. J. 15, 4836-4850 (2009), A. Uysal, W. Rock, B. Qiao, W. Bu, B. Lin, Two-Step Adsorption of PtCl62—Complexes at a Charged Langmuir Monolayer: Role of Hydration and Ion Correlations. J. Phys. Chem. C. 121, 25377-25383 (2017), I. Carson, K. J. MacRuary, E. D. Doidge, R. J. Ellis, R. A. Grant, R. J. Gordon, J. B. Love, C. A. Morrison, G. S. Nichol, P. A. Tasker, A. M. Wilson, Anion Receptor Design: Exploiting Outer-Sphere Coordination Chemistry To Obtain High Selectivity for Chloridometalates over Chloride. Inorg. Chem. 54, 8685-8692 (2015)). For example, FIG. 21 shows the platinum NMR taken during 8-HQ interaction with hexachloroplatinate anion. The results show a peak for platinum at 224.1 ppm suggest the chelating agent chelate the metal ion complex as well. A catalyst using the platinum nitrate as precursor on nanodiamond is shown in FIG. 15 at A.

Figure 22:
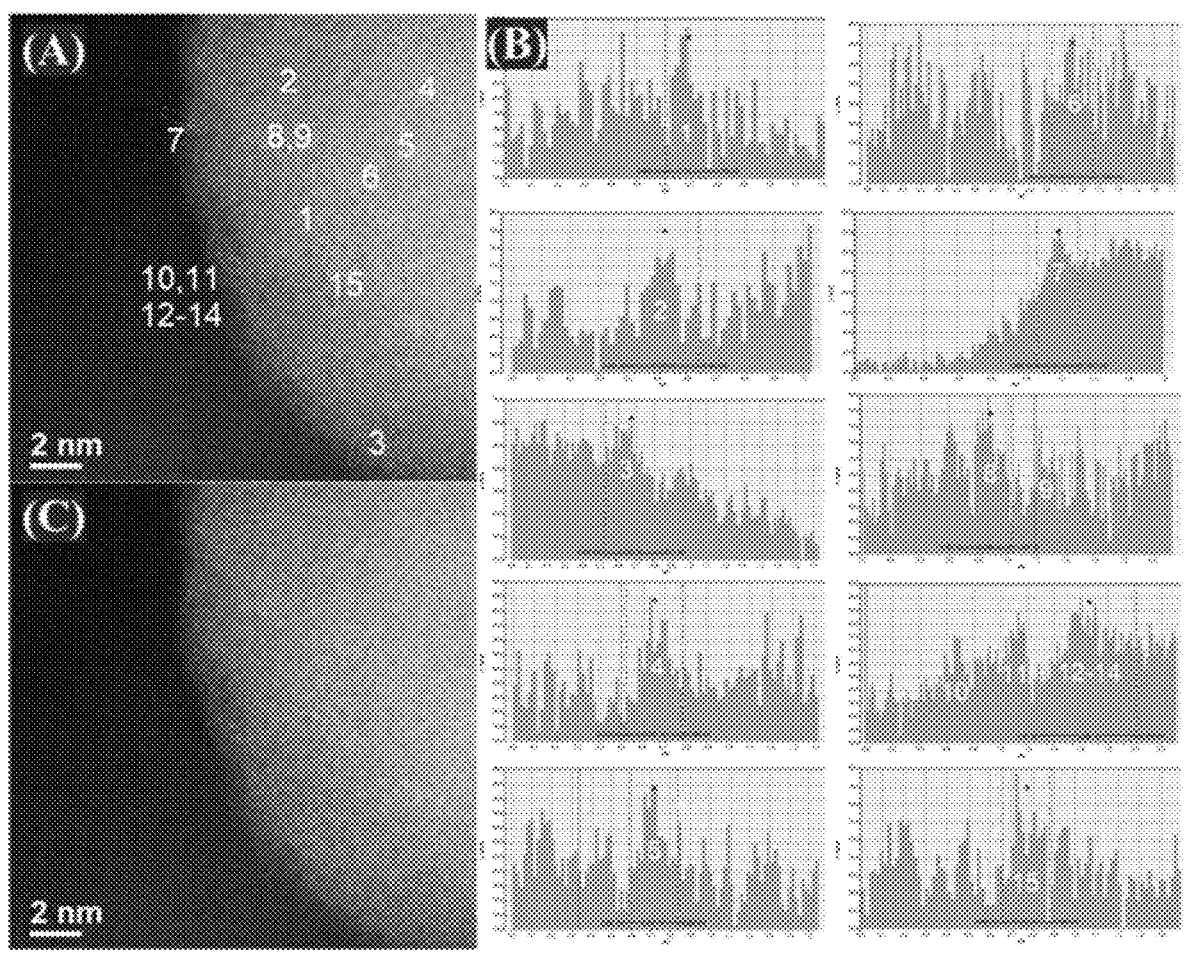
FIG. 22 shows image processing contrast scan at: (A) selected Pt single atoms on 0.78% Pt/SiO2 catalyst; (B) corresponding contrast histograms of the selected Pt single atoms; and (C) original AC-STEM image of 0.78% Pt/SiO2 catalyst.

The CheFi method appears to be very versatile with respect to both supports and metals. In addition to VXC-72 (i.e., carbon black) and Norit ROX (activated carbon), FIG. 15 at B shows a representative STEM image for 1% Pt on nanodiamond. The result shows that single Pt atoms can be produced on a support that has no surface functional groups. Silica and titania are two other common industrial oxide support substrates, and CheFi also yielded isolated Pt atoms (FIG. 15 at C, FIG. 22, FIG. 15 at D, respectively). With different metals, FIG. 15 at E and F show VXC-72-supported catalysts containing 3.5% Ir and 1.8% Ru prepared by the CheFi method.

In conclusion, the CheFi method is a simple, fast, and readily scalable synthetic strategy to produce SACs utilizing pre-existing support substrates. Perhaps most exciting is that the CheFi method is extremely simple, scalable, and can be applied to a wide variety of precursors regardless of the presence of ligands, charge, and ionic strength of the synthesis media.

Materials and Methods

Materials

Hexachloroplatinic(IV) acid hexahydrate and $TiO_2$-P25 were purchased from Sigma Aldrich. Norit ROX 0.8 was obtained from CABOT Corporation. The VXC-72 was purchased from the FuelcellStore. Ammonium hexachlororuthenate(IV) and Hexachloroiridic(IV) acid hydrate ≥99.9% (Ir basis) were supplied by STREM Chemical Inc. MS. The silica OX-50 support substrate was obtained from EVONIK company. Platinum(IV) nitrate solution (15% Pt) (w/w) and Tetraammineplatinum(II) nitrate were purchased from AlfaAesar materials company. Diamond Nanopowder (synthesized, 98+%, 3-10 nm) was obtained from Nanostructured & Amorphous Materials, Inc.

Methods

Figure 23:
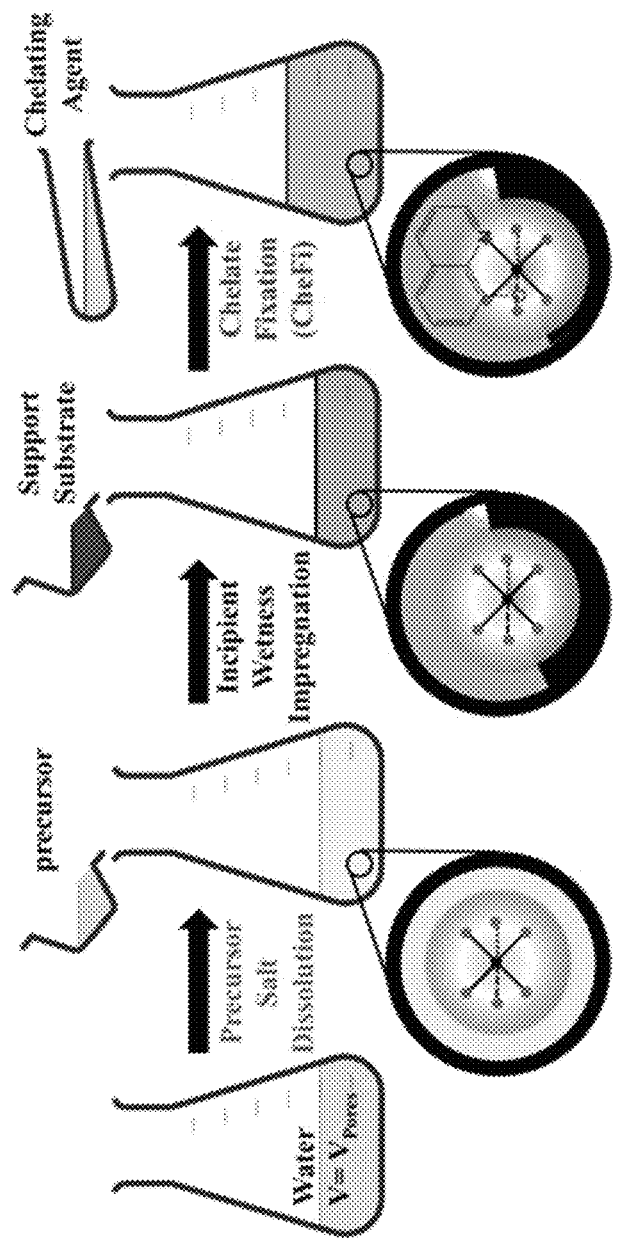
FIG. 23 shows a schematic of the synthesis procedure, from left to right, dissolution of catalyst precursor in water with a volume equal to the titration pore volume of the support, support substrate addition, and chelate fixation.

The synthesis procedure demonstrated in FIG. 23 is same as incipient wetness impregnation except the drying step replaced by chelate fixation. The detailed procedure starts with dissolution of predetermined amount of the catalyst precursor in water. Then, the support substrate is thoroughly mixed with a volume of the aqueous precursor solution equal to the titrated pore volume of the support substrate. The chelating agent is dissolved in a solvent with a larger dipole moment than water (i.e., acetone, DMF . . . ), and added to the aqueous precursor/support slurry in a 4:1 molar ratio of solvent to water. The 8-HQ concentration in the solvent is adjusted such that the 8-HQ:metal ion molar ratio is 2:1. After that, the resulting slurry is transferred to a tube furnace for reduction under 10% hydrogen balance nitrogen flow. For example, to deposit 7.7% Pt onto one gram of VXC-72, 0.1753 g H2PtCl6 (equivalent to 0.0834 g Pt) dissolved using 3.5 ml of DI water (titrated pore volume of the VXC-72). Then 1 g of VXC-72 was mixed with the solution and mixed thoroughly by a vortex mixer for two minutes at 3000 rpm. The next step was dissolution of 0.1247 g of 8-HQ in 11.1 ml acetone (4:1 molar ratio of acetone to water), added to the mixture and thoroughly mixed for two minutes. The resulting suspension was loaded into a crucible boat and placed in the reduction furnace. A flow of 10% hydrogen balance nitrogen was set at 400 sccm in a 1 inch diameter quartz tube. The suspension was dried at 50° C. for 30 minutes and then ramped up to 170° C. with a rate of 2° C./minute. The catalyst soaked at 170° C. for one hour and cooled to the room temperature. The chelating agent can be removed either with high temperature treatment or by washing with acetone following by drying the catalyst.

X-ray photoelectron spectroscopy (XPS) were measured with a Kratos AXIS Ultra DLD XPS system with a monochromatic Al Kα source operated at 15 keV and 150 W. Analysis was performed at a pressure below $1 \times 10^{-9}$ mbar and the X-ray incident of 45°. High resolution core level spectra were measured with a pass energy of 40 eV and analysis of the data was carried out using XPSPEAK41 software. In the case of nonconductive support, the XPS experiments were performed while using a charge neutralization electron gun directed on the catalyst. The XPS instrument was equipped with an in-situ catalyst treatment cell. The in-situ treatments were done under flow of 5% $H_2$/Ar for 1 hour at various temperature. An Inficon Transpector 2 Mass Spectrometer was utilized to study in situ CO temperature programmed as a function of time during a temperature ramp of 3° C./s.

All electron microscopy images were taken using a JEOL JEM-2100F Aberration Corrected Scanning Transmission Electron Microscope equipped with Fischione high angle annular darkfield detector (HAADF) with a camera length such that the detector spanned 50-163 mrad. The scanning acquisition was synchronized to 60 Hz AC electrical power to minimize 60 Hz noise in the images and a pixel dwell time of 15.8 μs was chosen. In some cases, when the support substrate is conductive and there is enough difference in atomic number between the elements in the system, it may be possible to characterize the SACs using Z-contrast imaging.

Nuclear magnetic resonance spectroscopy (NMR) was recorded using a Bruker Avance III-HD 500 MHz. The solution of $K_2PtCl_6$ was used as the reference to calibrate the NMR spectra. The solutions at different stage of synthesis procedure were subjected to the NMR measurements.

FIG. 24 shows Table 1, Compositions and applications of SACs with selected supports. Metals can be chosen as supports if the coordination and the electronic properties of the metal atoms need to be tuned. The advantages of metal supports are: (1) the fabrication methods for SAAs are usually easier to scale up and (2) the well-defined active sites in SAAs allow to understand and realize rational designs of SAAs using first principle calculations. The SAAs could address important challenges in industrial processes, such as for the selective hydrogenation of acetylene, the selective hydrogenation of 1,3-butadiene], the formation of $H_2$ in methanol reforming and also the methanol/ethanol oxidation reaction by optimizing the binding energy of the reactants and the intermediates, leading to higher selectivity, stability, and resistance against poisoning, see FIG. 14 Table 1.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A method for producing heterogeneous single atom catalysts comprising:
    dissolving at least one catalyst precursor in water to form a solution;
    mixing at least one support substrate in the solution;
    providing at least one metal precursor to the solution;
    preventing precursor agglomeration via dissolving at least one non-water soluble chelating agent in at least one polar solvent and adding this to the solution;
    providing and fixating precursor ions during catalyst activation;
    anchoring at least one metal precursor to the at least one support substrate, wherein the at least one support substrate comprises $TiO_2$ and/or $SiO_2$; and
    reducing the solution.

2. The method of claim 1, further comprising yielding loadings of single atoms up to at least 1 atom per $nm^2$.

3. The method of claim 1, wherein the at least one non-water soluble chelating agent comprises 8-hydroxyquinoline.

4. The method of claim 1, wherein strong electrostatic adsorption is not required to induce anchoring.

5. The method of claim 1, wherein either anionic or cationic metal precursors are employed.

6. The method of claim 1, further comprising conducting reduction at approximately 300° C.

7. The method of claim 1, further comprising the at least one support substrate forming a pore framework.

8. The method of claim 1, further comprising chelating metal ions or metal ion complexes with at least one ligand.

9. The method of claim 1, further comprising producing at least one single atom on the at least one support substrate without the at least one support substrate having surface functional groups.

10. The method of claim 1, further comprising removing the at least one chelating agent via high temperature treatment or washing with acetone followed by drying.

11. The method of claim 1, further comprising adjusting the at least one chelating agent to the at least one metal precursor ratio to 2:1.

12. A method for producing heterogeneous single atom catalysts comprising:
   dissolving at least one catalyst precursor in water to form a solution;
   mixing at least one support substrate in the solution;
   providing at least one metal precursor to the solution;
   preventing precursor agglomeration via dissolving at least one non-water soluble;
   chelating agent in at least one polar solvent and adding this to the solution;
   providing and fixating precursor ions during catalyst activation;
   anchoring at least one metal precursor to the at least one support substrate;
   reducing the solution; and
   further comprising chelating metal ions or metal ion complexes with at least one ligand.

13. The method of claim 12, wherein the at least one support substrate comprises carbon or an oxide.

14. The method of claim 13, wherein the carbon comprises carbon black, activated carbon, and/or diamond powder.

15. The method of claim 12, further comprising yielding loadings of single atoms up to at least 1 atom per $nm^2$.

16. The method of claim 12, wherein the at least one non-water soluble chelating agent comprises 8-hydroxyquinoline.

17. A method for producing heterogeneous single atom catalysts comprising:
   dissolving at least one catalyst precursor in water to form a solution;
   mixing at least one support substrate in the solution;
   providing at least one metal precursor to the solution;
   preventing precursor agglomeration via dissolving at least one non-water soluble chelating agent in at least one polar solvent and adding this to the solution;
   providing and fixating precursor ions during catalyst activation;
   anchoring at least one metal precursor to the at least one support substrate;
   reducing the solution and
   further comprising adjusting the at least one chelating agent to the at least one metal precursor ratio to 2:1.

* * * * *